US011004093B1

(12) United States Patent
Moon et al.

(10) Patent No.: US 11,004,093 B1
(45) Date of Patent: May 11, 2021

(54) METHOD AND SYSTEM FOR DETECTING SHOPPING GROUPS BASED ON TRAJECTORY DYNAMICS

(75) Inventors: Hankyu Moon, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 779 days.

(21) Appl. No.: 12/459,281

(22) Filed: Jun. 29, 2009

(51) Int. Cl.
*G06Q 30/02* (2012.01)
*G06K 9/00* (2006.01)
*G06T 7/292* (2017.01)
*G06T 7/277* (2017.01)

(52) U.S. Cl.
CPC ..... *G06Q 30/0201* (2013.01); *G06K 9/00778* (2013.01); *G06Q 30/0204* (2013.01); *G06T 7/277* (2017.01); *G06T 7/292* (2017.01)

(58) Field of Classification Search
CPC ........... G06Q 30/0201; G06Q 30/0204; G06K 9/00771; G06K 9/00778; G06K 9/00785; G06T 7/277; G06T 7/292
USPC ................................................ 705/7.11–7.42
See application file for complete search history.

(56) References Cited

U.S. PATENT DOCUMENTS

| | | | | |
|---|---|---|---|---|
| 6,236,975 B1 * | 5/2001 | Boe | ........................ | G06Q 30/02 705/14.19 |
| 6,263,088 B1 * | 7/2001 | Crabtree | ............... | G01S 3/7865 348/169 |
| 6,499,025 B1 * | 12/2002 | Horvitz | .............. | G06K 9/00234 342/64 |
| 6,659,344 B2 | 12/2003 | Otto et al. | | |
| 6,820,062 B1 * | 11/2004 | Gupta | .................... | B62B 3/1408 705/16 |
| 7,006,982 B2 | 2/2006 | Sorensen | | |
| 7,606,728 B2 * | 10/2009 | Sorensen | ........... | G06Q 30/0201 705/7.29 |
| 7,688,349 B2 * | 3/2010 | Flickner | ............. | G06K 9/00778 348/150 |

(Continued)

OTHER PUBLICATIONS

Alex Leykin., "Visual human tracking and group activity analysis: a video mining system for retail marketing," PhD thesis, Indiana University, Dec. 2007.*

(Continued)

*Primary Examiner* — Jerry O'Connor
*Assistant Examiner* — Abhijit B Sadananda

(57) ABSTRACT

The present invention is a method and system for detecting shopping groups based on the dynamic relation between shoppers' trajectories. First, shopper trajectories are generated using video images or positioning devices. Then, group behavior features are extracted from a candidate shopping group trajectory pair. The group behavior features of a given pair of trajectories are typically the changes in positional differences and the average speed of these trajectories. From a model of shopping group behavior, a given pair of candidate shopping group trajectories is analyzed to determine the group score—the likelihood of the pair of shoppers indeed belonging to the same group. Lastly, the system utilizes graph segmentation framework to find clusters where trajectories belonging to each cluster have tight group scores with each other.

10 Claims, 24 Drawing Sheets

(56) References Cited

U.S. PATENT DOCUMENTS

| | | | | |
|---|---|---|---|---|
| 7,908,237 B2* | 3/2011 | Angell | ............... | G06Q 30/0255 706/45 |
| 8,009,863 B1* | 8/2011 | Sharma | ............... | G06K 9/00335 382/100 |
| 8,295,597 B1* | 10/2012 | Sharma | .................... | G06T 7/20 382/173 |
| 8,412,656 B1* | 4/2013 | Baboo | ................ | G06Q 30/0201 706/20 |
| 2002/0161651 A1* | 10/2002 | Godsey et al. | ................ | 705/22 |
| 2003/0053659 A1 | 3/2003 | Pavlidis et al. | | |
| 2003/0058340 A1* | 3/2003 | Lin | .................... | G06K 9/00771 348/159 |
| 2004/0039679 A1* | 2/2004 | Norton | .................. | G06Q 40/04 705/37 |
| 2004/0098298 A1* | 5/2004 | Yin | ........................ | G06Q 30/02 705/7.29 |
| 2004/0113933 A1* | 6/2004 | Guler | ....................... | G06K 9/32 715/716 |
| 2004/0120581 A1* | 6/2004 | Ozer et al. | .................... | 382/224 |
| 2004/0130620 A1* | 7/2004 | Buehler | .................. | G06K 9/32 348/143 |
| 2004/0131254 A1 | 7/2004 | Liang et al. | | |
| 2005/0102183 A1 | 5/2005 | Kelliher et al. | | |
| 2005/0105765 A1* | 5/2005 | Han | ................. | G08B 13/19615 382/100 |
| 2005/0146605 A1* | 7/2005 | Lipton | ............. | H04N 21/44012 348/143 |
| 2005/0169367 A1* | 8/2005 | Venetianer | ........ | G06F 17/30799 375/240.01 |
| 2005/0177423 A1* | 8/2005 | Swanson, Sr. | ......... | G06Q 30/00 705/14.1 |
| 2005/0203790 A1* | 9/2005 | Cohen | .................... | G06Q 30/02 705/7.31 |
| 2005/0288911 A1* | 12/2005 | Porikli | ............... | G06K 9/00335 703/2 |
| 2006/0200378 A1* | 9/2006 | Sorensen | ............. | G06Q 10/063 705/7.29 |
| 2007/0067221 A1 | 3/2007 | Godsey et al. | | |
| 2007/0244630 A1* | 10/2007 | Toyoshima et al. | .......... | 701/200 |
| 2008/0018738 A1 | 1/2008 | Lipton et al. | | |
| 2008/0042836 A1 | 2/2008 | Christopher | | |
| 2008/0100704 A1* | 5/2008 | Venetianer | ........... | G08B 29/188 348/143 |
| 2008/0159634 A1* | 7/2008 | Sharma | .............. | G06K 9/00771 382/224 |
| 2008/0169929 A1* | 7/2008 | Albertson | ........ | G08B 13/19613 340/573.1 |
| 2008/0230603 A1* | 9/2008 | Stawar | ................... | B62B 3/1408 235/383 |
| 2008/0231432 A1* | 9/2008 | Stawar | ................... | B62B 3/1408 340/425.5 |
| 2009/0016600 A1* | 1/2009 | Eaton | ................. | G06K 9/00771 382/159 |
| 2009/0164284 A1* | 6/2009 | Koiso | .................... | G06Q 10/00 705/7.29 |
| 2009/0179753 A1* | 7/2009 | Bonner | ..................... | G01S 5/14 340/539.32 |
| 2009/0222388 A1* | 9/2009 | Hua | .................... | G06K 9/00778 706/12 |
| 2009/0240571 A1* | 9/2009 | Bonner | .................... | G01S 5/14 705/27.1 |
| 2009/0292549 A1* | 11/2009 | Ma | ..................... | G06K 9/00677 705/319 |

OTHER PUBLICATIONS

Kristie Seymore et al., "Learning hidden Markov Model structure for information extraction," AAAI technical report WS-99-11. Nov. 1999, pp. 37-42.*

Alex Leykin, "Detecting shopper goups in video sequences" AVSS 2007 IEEE conference, Sep. 2007. pp. 417-422.*

Somboon Hongeng et al., "video based event recognition: activity represntation and probabilistic recognition methods," Computer vision and image understanding, Elsevier, 96 (2004), 129-162.*

Dan Buzan et al., "extraction and clustering of motion trajectories in video," IEEE, The International Conference on Pattern Recognition, 2004.*

Xu, Li-Qun, Jose-Luis Landabaso, and Bangjun Lei. "Segmentation and tracking of multiple moving objects for intelligent video analysis." BT Technology Journal 22.3 (2004): 140-150.*

N.M. Oliver, B. Rosario, A.P. Pentland. "A Bayesian Computer Vision System for Modeling Human Interactions." IEEE Transactions on Pattern Analysis and Machine Intelligence, Aug. 2000, vol. 22, No. 8, p. 831-843. (Year: 2000).*

D.J. Kaup, T.L. Clarke, R. Oleson, L.C. Malone. "Crowd Dynamics Simulation Research." 16th Conference on Behavior Representation in Modeling and Simulation (BRIMS 2007), Mar. 2007, Norfolk, VA. (Year: 2007).*

M. Andersson, J. Gudmundsson, P. Laube, T. Wolle. "Reporting Leaders and Followers among Trajectories of Moving Point Objects." GeoInformatica, Dec. 2008, vol. 12, is. 4, p. 497-528 (Year: 2008).*

G.J. Brostow, R. Cipolla. "Unsupervised Bayesian Detection of Independent Motion in Crowds." 2006 IEEE Computer Society Conference on Computer Vision and Pattern Recognition (CVPR'06), Jun. 2006, New York, NY. (Year: 2006).*

D. Zhang, D. Gatica-Perez, S. Bengio, I. McCowan, G. "Modeling Individual and Group Actions in Meetings: A Two-Layer HMM Framework." 2004 IEEE Computer Society Conference on Computer Vision and Pattern Recognition Workshops (CVPRW'04), Jul. 2004, Washington, DC. (Year: 2004).*

N. Anjum, A. Cavallaro. "Multifeature Object Trajectory Clustering for Video Analysis." IEEE Transactions on Circuits and Systems for Video Technology, vol. 18, No. 11, Nov. 2008. p. 1555-1564. (Year: 2008).*

M. Brand. "Coupled Hidden Markov Models for Modeling Interacting Processes." Technical Report 405, MIT Lab for Perceptual Computing, 1997. (Year: 1997).*

K.H. Lee, M.G. Choi, Q. Hong, J. Lee. "Group Behavior from Video: A Data-Driven Approach to Crowd Simulation." SCA '07: Proceedings of the 2007 ACM SIGGRAPH/Eurographics Symposium on Computer Animation, Aug. 2007, San Diego, CA. p. 109-118. (Year: 2007).*

Starner, T., Pentland, A. "Real-Time American Sign Language Recognition from Video using Hidden Markov Models." Proceedings of International Symposium on Computer Vision (ISCV), Nov. 21-23, 1995, Coral Gables, FL, USA, p. 265-270. (Year: 1995).*

Zhou, Y., Yan, S., Huang, T. "Pair-Activity Classification by Bi-Trajectories Analysis." 2008 IEEE Conference on Computer Vision and Pattern Recognition, Jun. 23-28, 2008, Anchorage, AK, USA. (Year: 2008).*

I. Haritaoglu, et al., "Detection and Tracking of Shopping Groups in Stores," IEEE Computer Society Conference on Computer Vision and Pattern Recognition, vol. 1, pp. 431, 2001.

\* cited by examiner

| GROUP ID | GROUP COMPOSITION | | | GROUP DYNAMICS | | GROUP PERFORMANCE | |
|---|---|---|---|---|---|---|---|
| | SIZE | GENDER | AGE | LEADER TRAJECTORY ID | % OF TIME TOGETHER | TOTAL TIME SPENT | TOTAL SPENT DOLLAR |
| 1 | 2 | 1M/1F | 2 ADULT | 26 | 80% | 40MIN | $49.00 |
| 2 | 1 | 1F | 1ADULT | 42 | N/A | 25MIN | $45.00 |
| 3 | 3 | 1M/2F | 2ADULT/1CHILD | 59 | 90% | 55NIN | $65.00 |
| 4 | 1 | 1M | 1ADULT | 52 | N/A | 15MIN | $24.00 |
| ... | ... | ... | ... | ... | ... | ... | ... |
| N | 3 | 3F | 1ADULT/2CHILD | 80 | 70% | 52MIN | $82.00 |

Fig.24

METHOD AND SYSTEM FOR DETECTING SHOPPING GROUPS BASED ON TRAJECTORY DYNAMICS

FEDERALLY SPONSORED RESEARCH

The invention was made partially with U.S. Government support under Grant No. 0548734 awarded by the National Science Foundation. The U.S. government has certain rights in the invention.

CROSS-REFERENCE TO RELATED APPLICATIONS

Not Applicable

SEQUENCE LISTING OR PROGRAM

Not Applicable

BACKGROUND OF THE INVENTION

Field of the Invention

The present invention is a method and system to detect shopping groups based on the dynamic relation between shoppers' trajectories.

Background of the Invention

The current consumer and market-oriented economy places a great deal of importance on shoppers' behavior and decision making processes in a retail space—how shoppers look for and interact with products and with other family members to make purchase decisions. There is also a consensus within the market research community that today's consumers make most of their purchase decisions while in stores. Until shoppers finally make decisions to purchase certain products, they often make comparisons with alternative products and try to gather more information about them. When the shoppers come in groups—such as family or friends, they often consult each other before making a decision, as well; a group of shoppers will show different purchase patterns than those who come to the store alone. Even when they don't purchase some of the items with which they interacted, the information about their interactions with products and with another person—constitutes very valuable marketing data. Transaction data alone is not able to deliver such information.

When shoppers come to a store in groups, their behavior is complex and often reveals very different characteristics than when they shop alone. In some cases, they move together for the whole duration of the shopping trip. In other cases, they enter the store and sometimes split apart to shop for different items to save time. Shopping groups can also show complex behaviors that are combinations of these two—they sometimes move around the store together and separately, as necessary. Children may generally stay somewhat near their parent(s), but they will often venture out some distances and then return to again be near their parents. These complex behaviors of shopping groups may become a serious issue for video analytics of consumer behavior. In general, shoppers' trajectories can be generated by processing videos of them, using a currently available person-tracking technology. The trajectories can be further analyzed in the context of a store layout to produce valuable marketing information about how shoppers move around the store to find and pick up items. The data can also be compared to the point-of-sales data, to draw meaningful conclusions. However, group behavior can be problematic for such analysis, because members in such a group may have common goals for shopping, but often appear to move independently. This is especially of concern if the group's trajectories are analyzed regardless of group membership, causing group behavior to corrupt the data that concerns the relation between product categories based on the shopping trip and the association between the behavior data and the POS data. Conversely, if the trajectories belonging to a shopping group can be combined together, such information will greatly increase the accuracy of the shopper behavior data.

On the other hand, such group behavior data itself is also very viable marketing data. It may reveal information about how family members coordinate to shop for household items, and how they affect each other in making purchase decisions. Some such information can be derived from trajectories of group members. For example, if members of the group split and shop separately, their trajectories will show which product categories each visited separately. If the trajectories stay together at one product category for a while, it means that they shop together for that category. If the trajectory data is associated with POS data, then it may be possible to identify a decision maker of the group by comparing the shopping history—the product categories that each person visited—and the purchased items. If the trajectory data is associated with demographics data, then the associated data provides for a much richer analysis of how members of a household—husband, wife, children, etc.—interact and make decisions.

Recent developments in computer vision and artificial intelligence technology make it possible to detect and track people from video sequences so that their trajectories can be estimated. More specifically, body detection can locate any human body images from a video sequence and track each individual's movements, so that the system can estimate each shopper's positions over time.

The estimated trajectories contain much information about a group. Trajectories staying or moving together for more than a certain amount of time can naturally be regarded as belonging to a group, especially when two trajectories move together from one product category to another, and they are most likely shopping together. However, group trajectory analysis is not always as obvious. Unrelated shoppers may happen to stay together in proximity, and the trajectories themselves may contain errors—such as broken trajectories, or erroneously connected trajectories. The present invention models shopping group behaviors to cluster shopper trajectories into groups. The method defines atomic group behaviors, such as staying together, walking together, splitting apart, and merging. Typical group behavior involves a progression of these atomic group behaviors. For example, after a couple enters a store together (walking together), they may split and go to different sections to meet individual needs (splitting). They can meet at some point and shop together for other items (merging). Whenever they find a desirable item, they might stop for further examination and decision making (staying together).

The present invention concerns the problem of grouping the generated shopper trajectories according to shopping group membership. Based on the behavior model mentioned above, the method interprets the shopping trajectory into such atomic behaviors to further determine the shopper's intention. In one exemplary embodiment, the invention employs a probabilistic graphical model—such as a Hidden Markov Model—to interpret the shopping trajectories.

There have been prior attempts for tracking people's motion for the purpose of understanding their behaviors.

U.S. Pat. Appl. Pub. No. 2003/0053659 of Pavlidis, et al. (hereinafter Pavlidis) disclosed a method for moving object assessment, including an object path in a search area, using a plurality of imaging devices and segmentation by background subtraction.

U.S. Pat. Appl. Pub. No. 2004/0120581 of Ozer, et al. (hereinafter Ozer) disclosed a method for identifying the activity of customers for marketing purposes or surveillance, by comparing the detected objects with the graphs from a database. Ozer tracked the movement of different object parts and combined them to high-level activity semantics, using several Hidden Markov Models (HMMs) and a distance classifier.

U.S. Pat. Appl. Pub. No. 2004/0131254 of Liang, et al. (hereinafter Liang) also disclosed the Hidden Markov Models (HMMs), along with the rule-based label analysis and the token parsing procedure, to characterize behavior. Liang disclosed a method for monitoring and classifying the actions of various objects in a video, using background subtraction for object detection and tracking.

U.S. Pat. Appl. Pub. No. 2008/0018738 of Lipton, et al. (hereinafter Lipton) disclosed a system for the video monitoring of a retail business; including a video analytics engine to process video obtained by a video camera and generate video primitives.

"Detection and Tracking of Shopping Groups in Stores," Proceedings of IEEE Computer Society Conference on Computer Vision and Pattern Recognition, Volume 1, by Haritaoglu, et al. (hereinafter Haritaoglu) disclosed a monocular real-time computer vision system that identifies shopping groups by detecting and tracking multiple people in a checkout line or at a service counter.

Pavlidis was primarily related to monitoring a search area for surveillance, using visual tracking. Ozer, Liang, and Lipton all define behavior primitives and try to determine whether a given video stream contains the sequence of these primitive behaviors, using probabilistic graphical model approaches, such as HMM. The present invention employs a similar approach to model the shoppers' behaviors in retail aisles to determine their group membership, but it further investigates the shopper's pairwise group behaviors using the graphical model approach, which is foreign to these prior inventions. Haritaoglu proposes a customer grouping method at the checkout area of stores, and utilizes graphical partitioning framework based on trajectory distances to determine the group membership of shoppers at the checkout. The present invention may employ similar graphical partitioning framework, however, the proximity scores are instead computed from a probabilistic graphical model, such as HMM, based on discrete atomic group behaviors, such as staying together, walking together, merging, splitting, etc.

There have been prior attempts for tracking customers or measuring customer interactions with products using communication devices for the purpose of understanding customer behaviors.

U.S. Pat. No. 6,659,344 of Otto, et al. presents a shopper behavior monitoring system using RFID tags attached to products and RFID scanners installed in shopping baskets, so that the system can detect product purchase at the shelf and identify the purchase items. In U.S. Pat. No. 7,006,982 of Sorensen and U.S. Pat. Appl. Pub. No. 2008/0042836 of Christopher, a shopper is tracked using a wireless tracking device installed in the shopping cart. The trajectory of the shopper is analyzed to deduce the interaction of the shopper with the products. In U.S. Pat. Appl. Pub. No. 2005/0102183 of Kelliher, et al., the comparison between the acquired items and checkout items is made based on the shopper location and behavior estimated from RFID tracking devices, so that potential fraud can be detected. In U.S. Pat. Appl. Pub. No. 2007/0067221 of Godsey, et al., the RFID system is used to detect product purchase. The present invention can also process trajectory data generated from such devices to determine shopping groups. In one of its exemplary embodiment, the present invention also utilizes video cameras to track shoppers and generate trajectories, without using any costly and cumbersome devices.

In summary, the present invention provides an approach to analyzing shoppers' trajectories in retail aisles, in a pairwise manner, to determine shopping groups. Unlike some of the prior inventions, the present invention investigates the pairwise collective group behavior of shoppers. Unlike some of the prior inventions, the present invention does not require any visual information—such as identified body parts of the shoppers or the movements of body parts—other than the trajectories of the shoppers. As do some of the prior inventions, the present invention utilizes a model of behavioral primitives and the probabilistic relations between them. However, the present invention adopts a set of dynamic behavioral primitives—such as staying together, walking together, merging, splitting, etc.—specifically chosen to deduce whether or not a pair of shoppers belong to a group.

SUMMARY

The present invention is a method and system to detect shopping groups based on the dynamic relation between shoppers' trajectories.

It is one of the objectives of the first step of the processing to generate shopper trajectories. In one of the exemplary embodiments, the step starts with detecting people from a video sequence. The detected people are then tracked individually to generate their trajectories. In another exemplary embodiment, the customer trajectory can be generated from special positioning devices such as RFID tags and RFID tag readers.

It is one of the objectives of the second step of the processing to extract group behavior features from a pair of shopper trajectories. The group behavior features of a given pair of trajectories are typically the changes in positional differences and the average speed of these trajectories. These trajectory features are specifically chosen to convey information about the interaction between the two shoppers.

It is one of the objectives of the third step of the processing to model the group behavior of shopper trajectory pairs. The shopper group behavior model includes the primitive interactions between a pair of shoppers that are relevant to determining whether or not the two are in a shopping group. In one of the exemplary embodiments, the step builds and trains a Hidden Markov Model that models the state transitions of such group behaviors.

It is one of the objectives of the fourth step of the processing to analyze a given pair of shopper trajectories to determine the group membership. In one of the exemplary embodiments, the step utilizes a Hidden Markov Model to decode the pair of shopper trajectories to generate the progression of states of shopping group behaviors. The decoded progression of the shopping group behavior states determines the group score—how likely the pair of shoppers indeed belongs to the same group. In one of the exemplary embodiments, the step utilizes demographic-based prior information about the shoppers and/or the store position-based prior to adjust the group scores.

It is one of the objectives of the fifth step of the processing to group the trajectories based on the group scores. In one of the exemplary embodiments, the step utilizes graph segmentation framework to find clusters, where trajectories belonging to each cluster have tight group scores with each other. In one of the exemplary embodiments, the step employs a multi-trajectory model to further merge the shopping groups into new shopping groups.

DRAWINGS—FIGURES

FIG. 24 shows output data of the present invention in an exemplary business application.

DETAILED DESCRIPTION OF THE INVENTION

Figure 1:
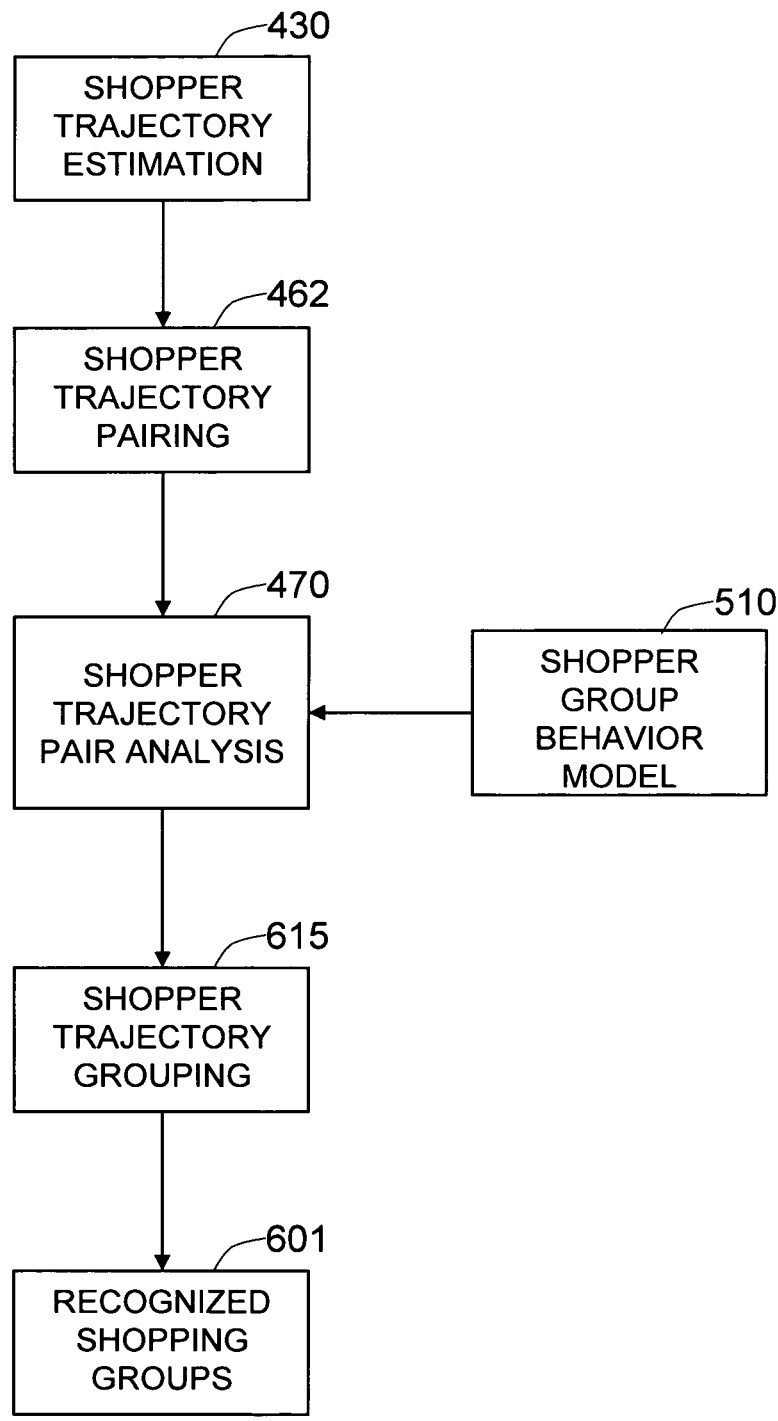
FIG. 1 is an overall scheme of the system in a preferred embodiment of the invention.

FIG. 1 is an overall scheme of the system in a preferred embodiment of the invention. The shopper trajectory estimation 430 step detects and tracks shoppers from an input video sequence and generates their trajectories. Then the shopper trajectory pairing 462 step combines two candidate trajectories as a pair, so that the pair can be analyzed to determine whether or not they belong to the same shopping group. The shopper group behavior model 510 concerns the relationship between the group membership of the pair and the behavioral difference manifested in the trajectory pair. In one of the exemplary embodiments, the shopper group behavior model consists of the relationship between the trajectory dynamics of the pair (the positional differences between the trajectories and the average speed) and atomic group behaviors (such staying together, walking together, splitting, and merging). Given a pair of shopper trajectories, the shopper trajectory pair analysis 470 step then analyzes them based on the shopper group behavior model 510. The shopper trajectory grouping 615 step finally produces the recognized shopping groups 601.

Figure 2:
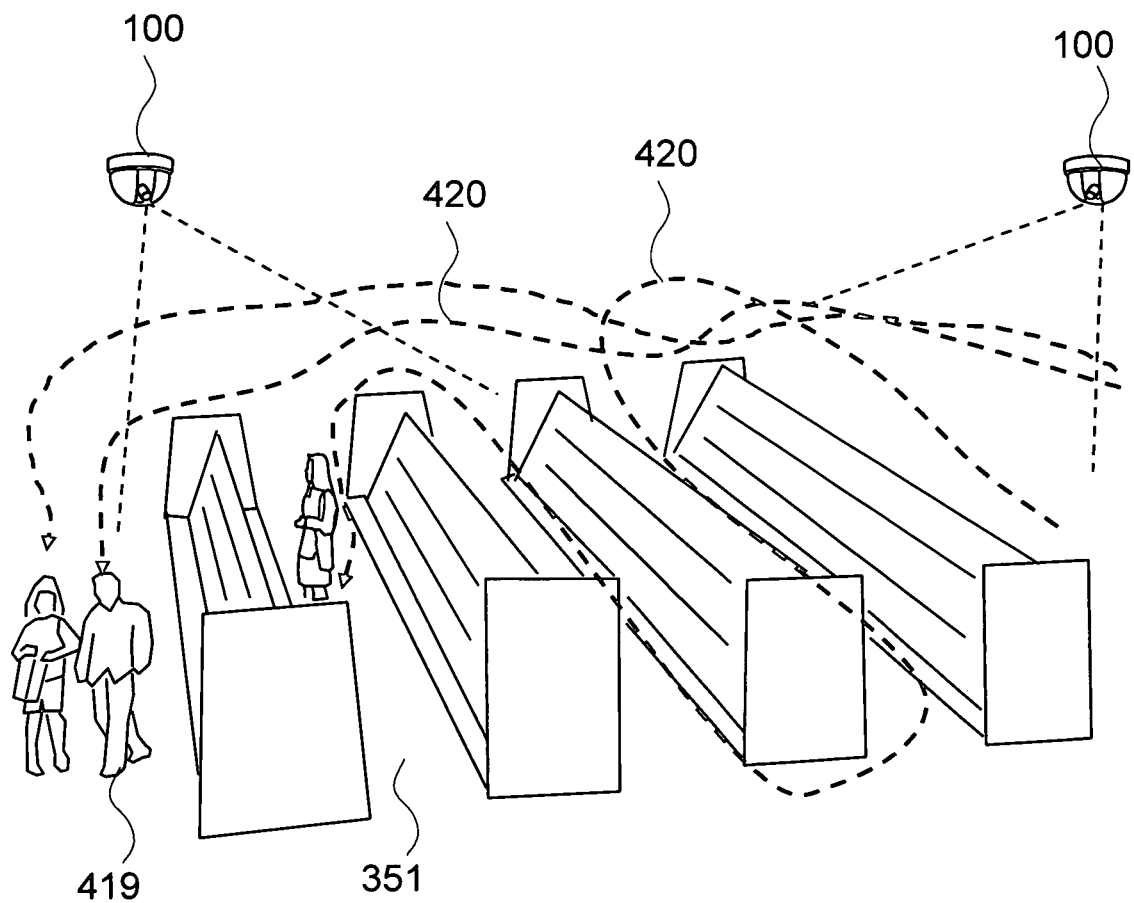
FIG. 2 shows a view of the system of the invention in an operational environment in an exemplary embodiment.

FIG. 2 shows a view of the system of the invention in an operational environment in an exemplary embodiment. Shoppers 419 browse through the store aisles 351 either in groups or individually, looking for items to purchase. The means for capturing images 100 track the shoppers within each field-of-view, and possibly across different fields-of-view. The shopper trajectory estimation 430 module processes the images from the means for capturing images 100 to generate a trajectory 420 of each shopper. The shopper trajectory estimation 430 module records both the spatial coordinates and the timestamps of the instances of the shoppers, so that further processing can analyze the trajectories to determine the group membership of the trajectories. The camera coordinates estimated from each means for capturing images are converted to world coordinates, so that the trajectories can be consistently estimated across multiple views.

Figure 3:
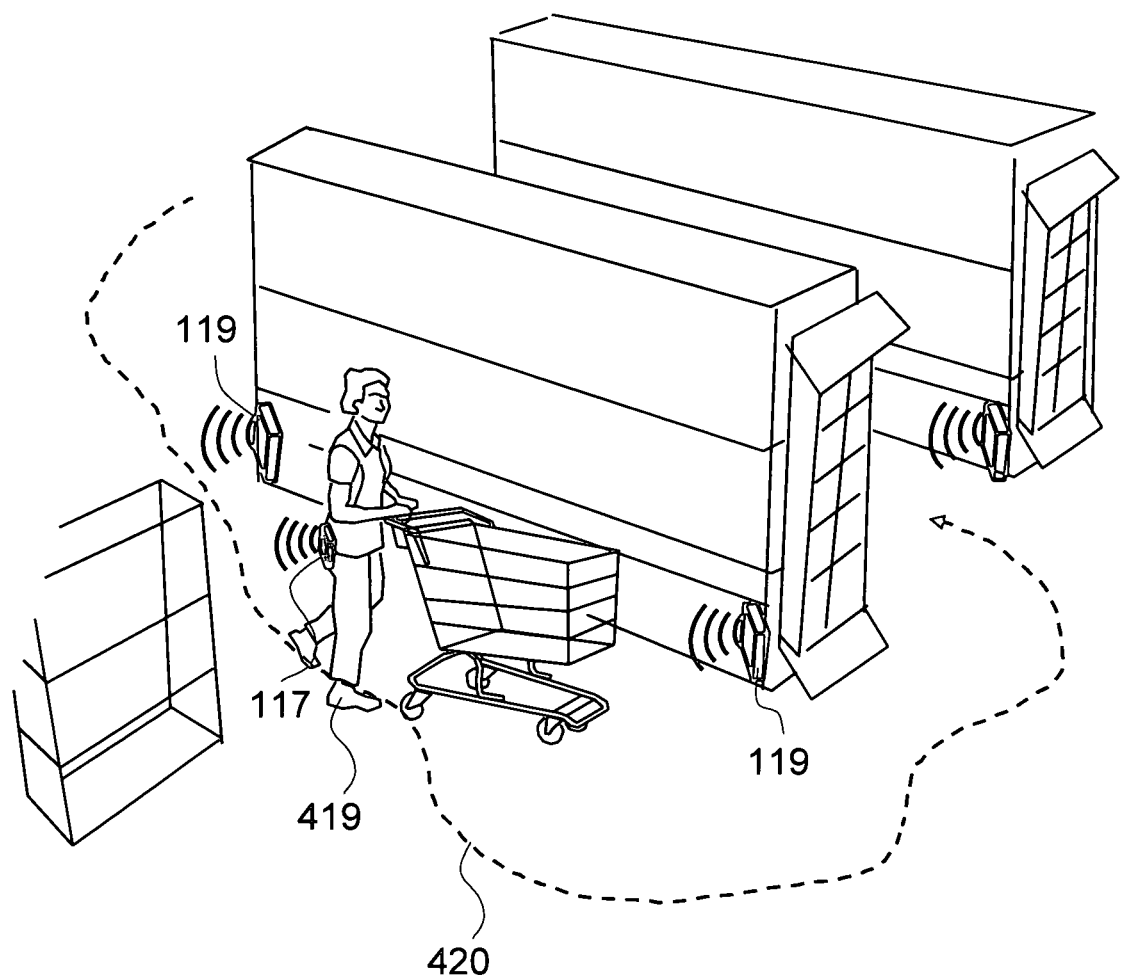
FIG. 3 shows a view of the system of the invention in an operational environment in an exemplary embodiment.

FIG. 3 shows a view of the system of the invention in an operational environment in an exemplary embodiment. In this embodiment, the RFID tag proximity detection is employed to track the positions of shoppers who carry the RFID tags 117. The means for sensing using RFID tags 117, such as RFID tag readers 119, are installed throughout various locations in the retail space, and the retail shoppers carry the portable RFID tags 117. The RFID tag readers 119 receive wireless signals emitted from the RFID tags 117, and coordination of such RFID tag readers 119 makes it possible to estimate the positions of the RFID tags 117. The positions of the shopper 419 recorded at each instance constitute a shopper trajectory 420.

The exemplary embodiment shown in FIG. 3 shows three RFID tag readers 119, installed in the vicinity of the aisle entry points. Each tag reader generates an event containing a timestamp and the unique RFID signature whenever the customer passes by the proximate area. The positions and the corresponding timestamps of shoppers determined by the RFID devices can be readily converted to trajectories of the shoppers.

Figure 4:
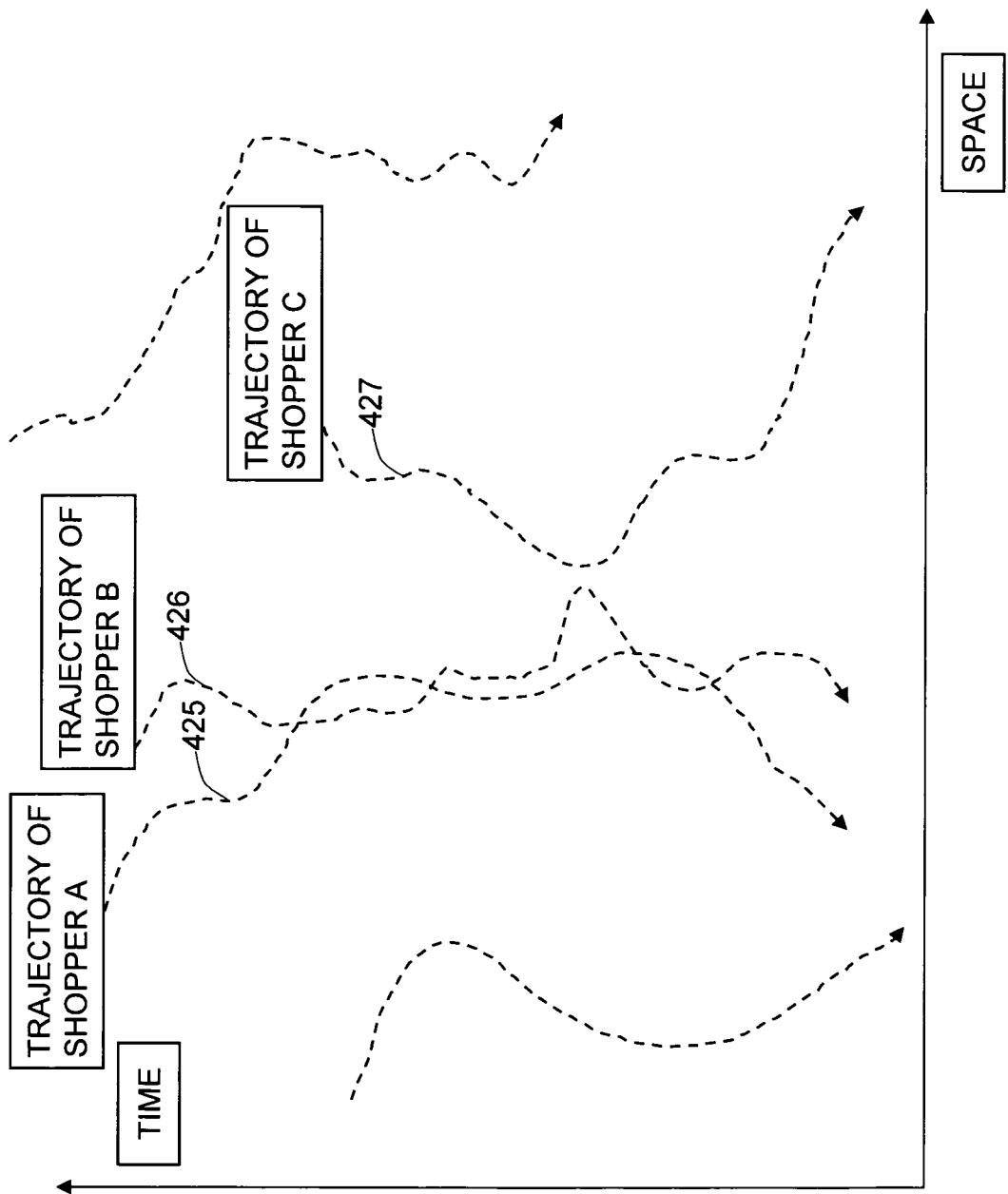
FIG. 4 shows an exemplary embodiment of the shopper trajectories generated from the shopper trajectory paring step.

FIG. 4 shows an exemplary embodiment of the shopper trajectories 422 generated from the shopper trajectory estimation 430 step. The trajectories are shown in spatiotemporal dimension of time and space. These trajectories reveal the behaviors of three shoppers.

Any subset of trajectories that are close in both space and time become candidates for grouping. The three labeled trajectories are such candidates. The trajectory of shopper A 425 moves closely with the trajectory of shopper B 426. The interplay between the two trajectories shows that the shopper A and the shopper B are related. Even though the trajectory of shopper B 426 gets very close to the trajectory of shopper C 427, it happens only once and the duration is very short. It can be derived that the shopper C is not related to the shopper B or the shopper A.

The present invention compares any pair of trajectories that are close in spatiotemporal dimension to determine whether or not they show group-like behavior.

Figure 5:
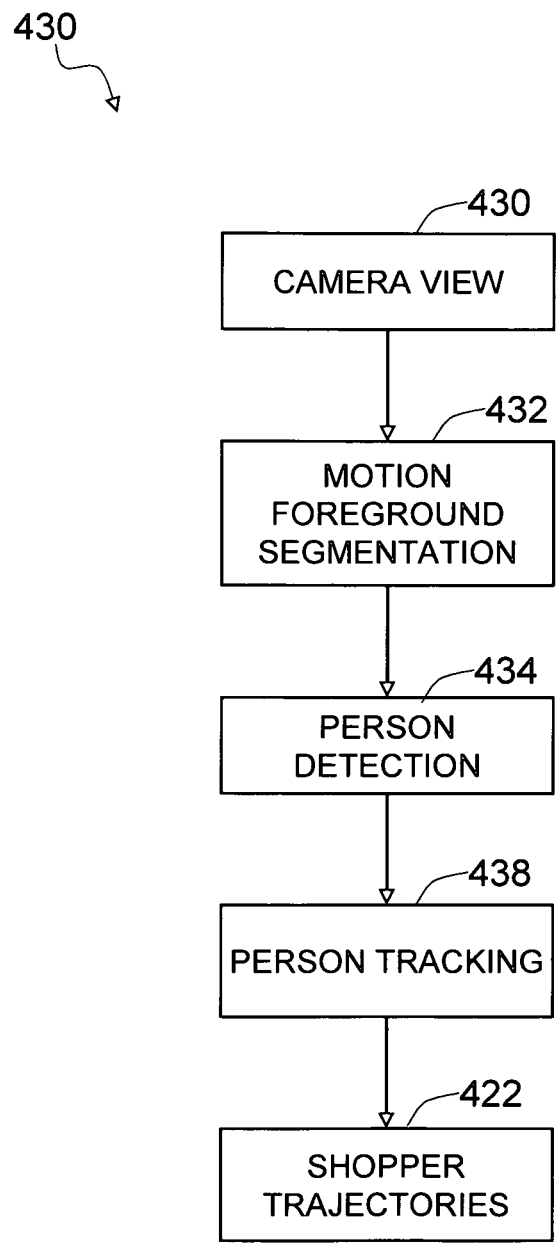
FIG. 5 shows an exemplary embodiment of the shopper trajectory estimation step.

FIG. 5 shows an exemplary embodiment of the shopper trajectory estimation 430 step. From a camera view 311 that captures the movements of shoppers in a store space, the motion foreground segmentation 432 step first segments out the regions in the view that potentially contain the shoppers. The person detection 434 step specifically searches for shoppers individually, so that the next person tracking 438 step can keep their identities through the frames. The shopper trajectory estimation 430 step finally records the shopper trajectories 422—the tracked movements of the shoppers—in an appropriate form, so that they can be further analyzed in the following steps.

In one of the exemplary embodiments, the person detection 434 step utilizes a machine learning-based human body detector, where a learning machine is trained to determine whether or not a given image contains a human body. In one of the exemplary embodiments, the person tracking 438 step utilizes a multi-hypothesis tracker based on a particle filtering technique.

Figure 6:
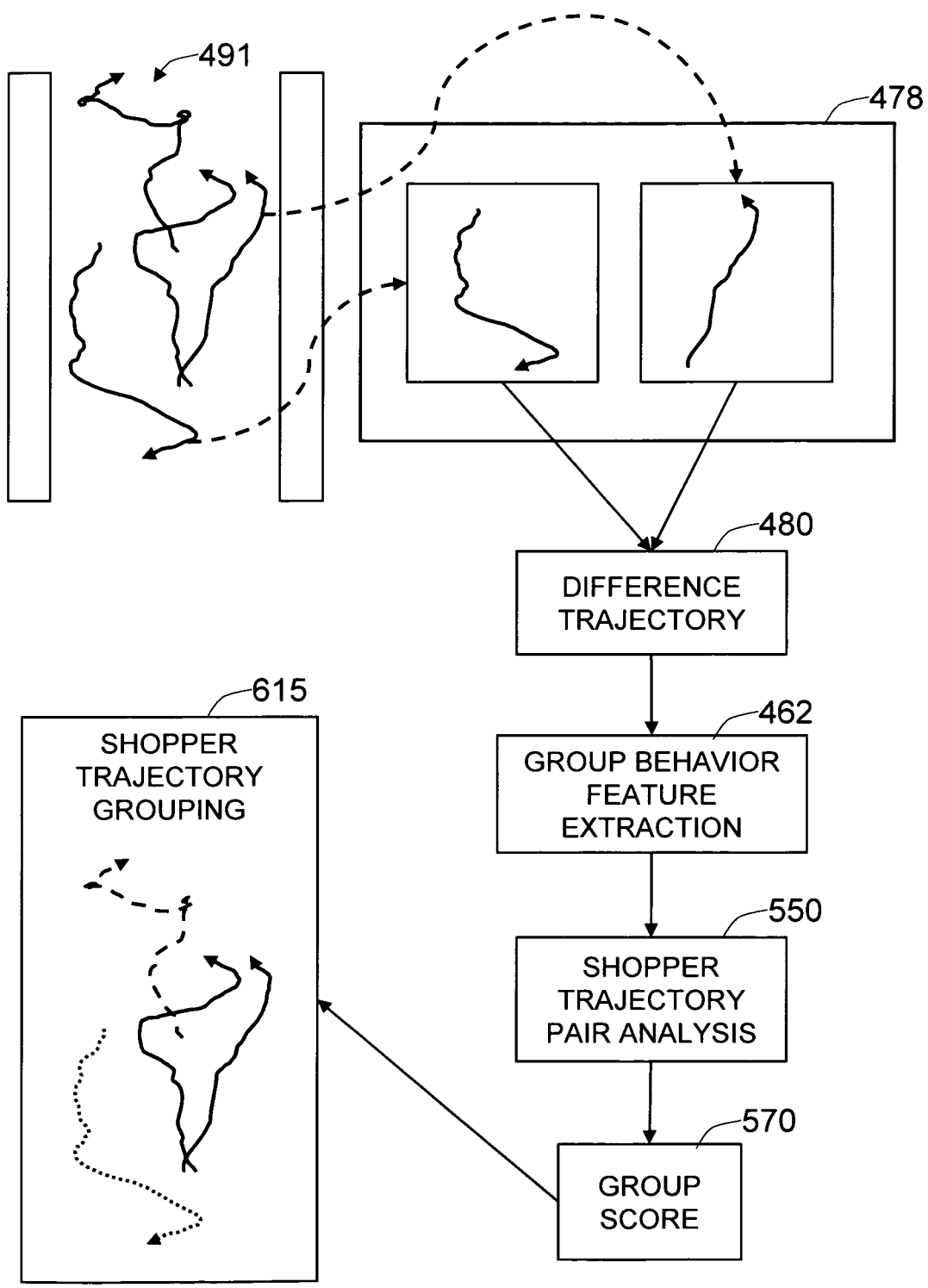
FIG. 6 shows an exemplary embodiment of the shopper trajectory pairing step.

FIG. 6 is an exemplary embodiment of the shopper trajectory pairing 462 step. First, a pair of trajectories 478 is selected from the pool of candidate trajectories 491. Then the difference trajectory 480 is generated. The difference trajectory 480 is computed for the time period when the two trajectories overlap. It consists of points that are vector differences between the points from the first trajectory and the points from the second trajectory at each matching time instance. When the two trajectories have been generated from a single camera view, then the time stamps of the trajectory points should match exactly. When the time stamps between the trajectory points do not match, then the points that are closest in time are compared. Whenever the two shoppers stay close at an instance, the corresponding point in the difference trajectory 480 will be very close to the origin (0, 0). If the two shoppers are far apart, then the corresponding point in the difference trajectory 480 will be far away from the origin, and the position of the point will reveal the relative position of the second shopper to the first shopper.

Then the group behavior feature extraction 462 step will extract dynamic features that are relevant to differentiating group behavior from non-group behavior. Such group behaviors may include shoppers staying together, shoppers moving together, and shoppers approaching each other. The relevant dynamic features include the changes of distance between the two shoppers and the speeds of their movement.

The shopper trajectory pair analysis 550 step then interprets the extracted features to determine the likelihood of the pair of trajectories belonging to the same shopping group—quantized into a shopper trajectory pair group score 570.

Figure 7:
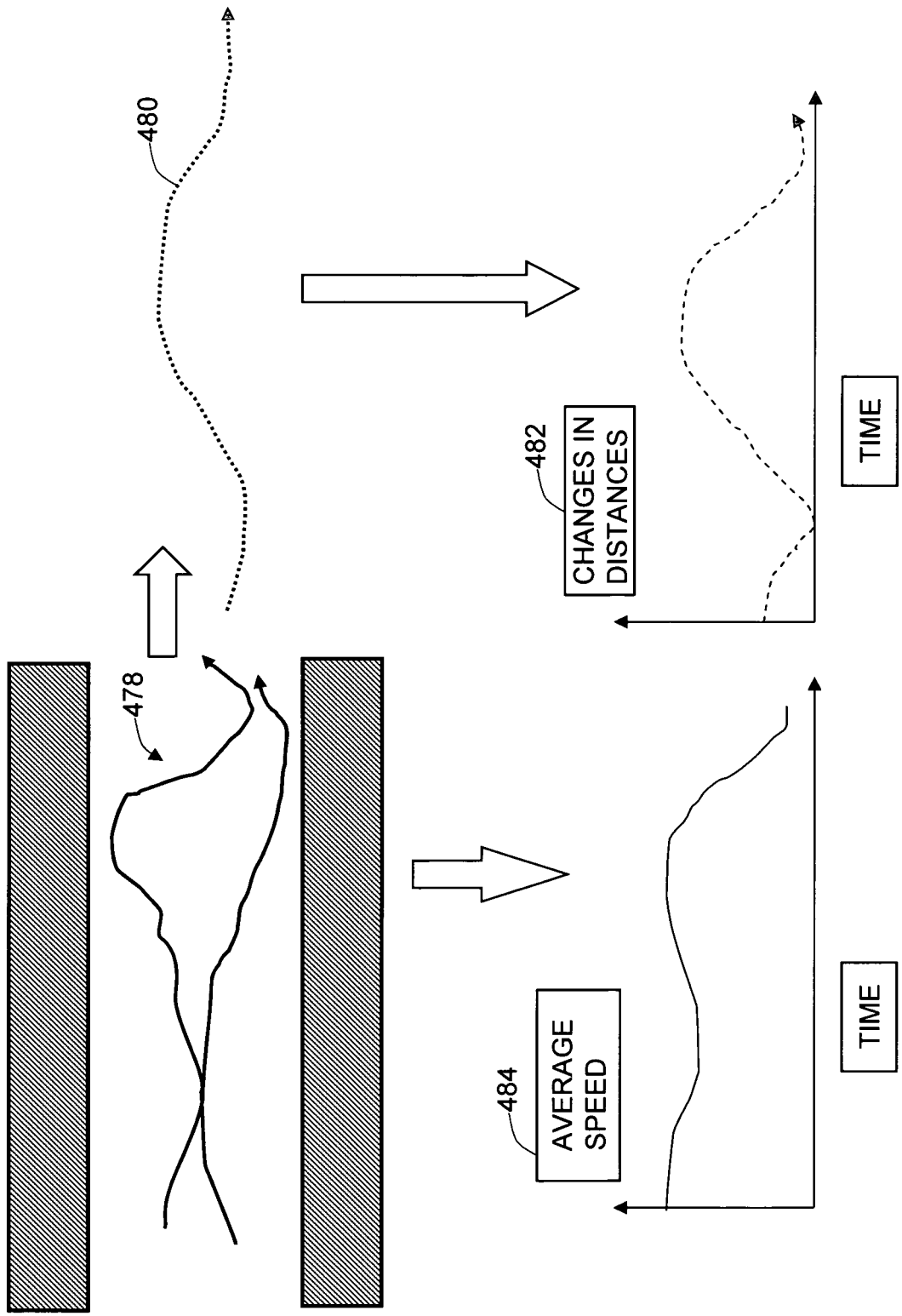
FIG. 7 shows an exemplary embodiment of the group behavior feature extraction step.

FIG. 7 shows an exemplary embodiment of the group behavior feature extraction 462 step. In this embodiment, the group behavior features 460 are extracted for a pair of trajectories 478. First, the difference trajectory 480 between the two trajectories is computed. The difference trajectory 480 is computed for the time period during which the two trajectories overlap. It consists of points that are vector differences between the points from the first trajectory and the points from the second trajectory at each matching time instance. The difference trajectory 480 retains the information about the changes in distances 482 between the trajectories points. The changes in distances 482 between the two shoppers are one of the key features to analyze the group behavior. Another group behavior feature is the average speed of the two trajectories. The difference trajectory 480 does not make a distinction between "walking together" and "staying together" because the difference trajectory 480 only retains the relative motion between the two; the average speed 484 retains the motion information. These two features are used in the shopper trajectory pair analysis 470 step to derive group information.

Figure 8:
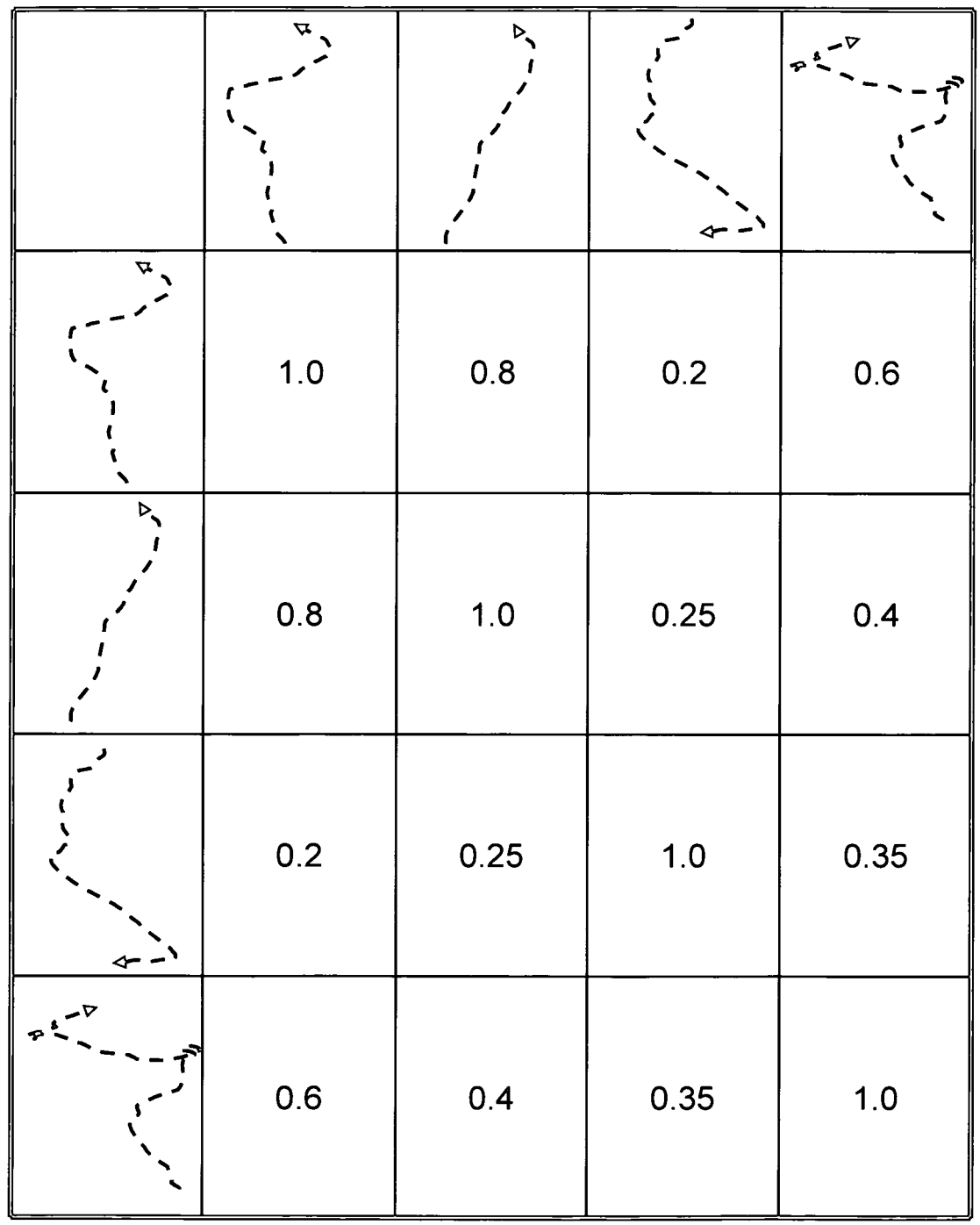
FIG. 8 shows an exemplary output from shopper trajectory pair analysis.

FIG. 8 shows an exemplary output from shopper trajectory pair analysis 470. The output is summarized in a table, where each (i-th, j-th) position in the table represents the group score 570 between the i-th trajectory and the j-the trajectory. For example, the group score 570 between the first trajectory and the second trajectory is 0.8. In this embodiment, the group score is the likelihood of the two trajectories belonging to the same shopping group, and is computed from the shopper trajectory pair analysis 470 step. The shopper trajectory grouping 615 step then combines together the trajectories, so that any pair of trajectories within the same group has a high group score 571 and any pair of trajectories from a different group has a low group score 571.

Figure 9:
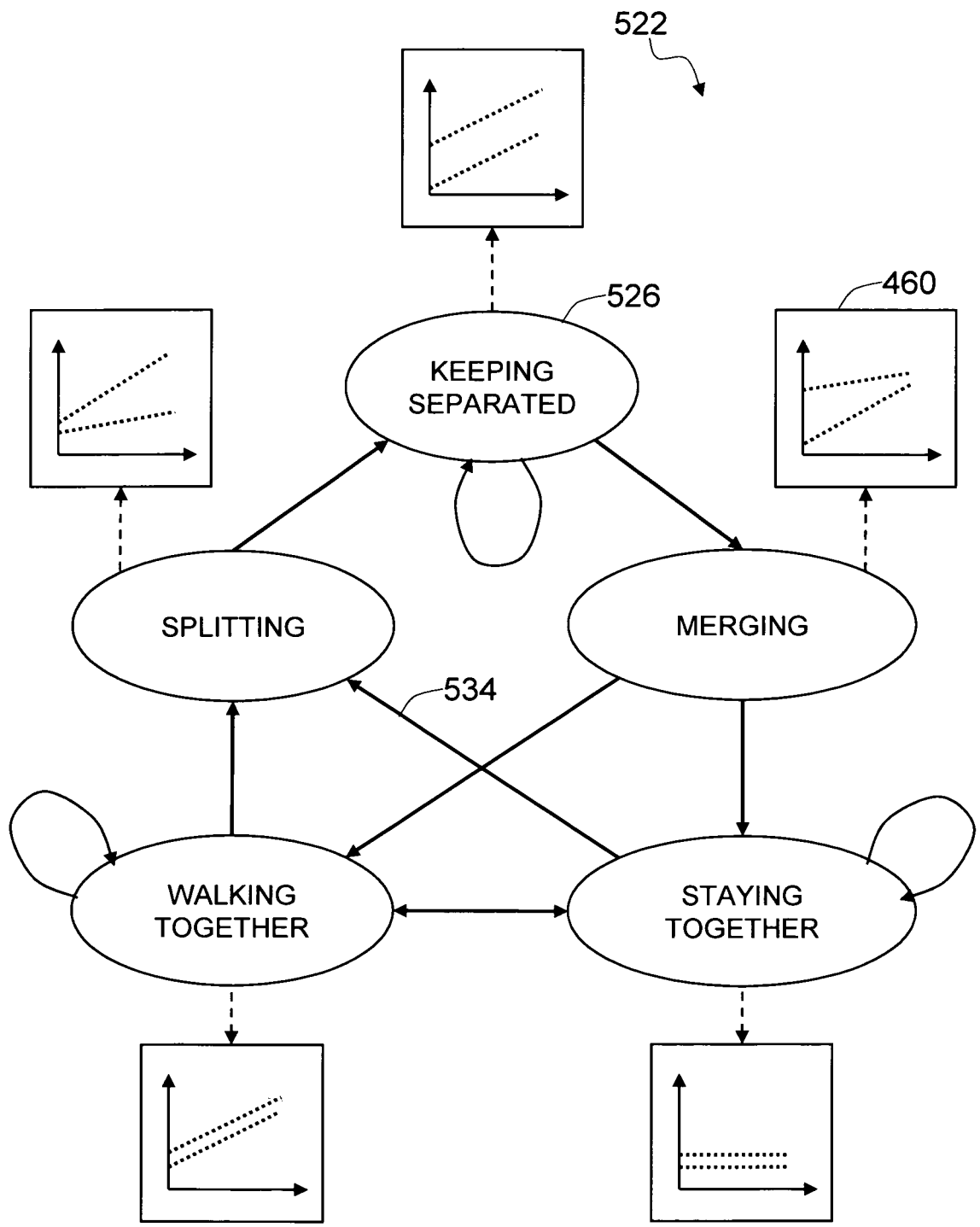
FIG. 9 shows an exemplary embodiment of the shopper group behavior model that is illustrated using a finite state machine.

FIG. 9 shows an exemplary embodiment of the shopper group behavior model 510 that is illustrated using a finite state machine. The model is named as the group behavior model 522; the model represents the behavior of a pair of shoppers belonging to the same group. The five group behavior states 526—walking together 514, staying together 512, splitting 518, merging 516, and keeping separated 519—are the nodes of the model, and all of the possible state transitions 534 are marked by arrows. The model can represent all of the possible scenarios (progressions of states) during group shopping, using the transitions of these states. The rectangles represent the typically observed group behavior features 460 when the pair of shoppers is in the corresponding state (corresponded by uni-directional arrows). The observed group behavior features 460 include the distance change 482 and the average speed 484.

The state progression of the group behavior can be determined based on the illustrated relationship between the states and the observed features. For example, if the pair of shoppers have been walking together and start to separate (split), then the pair is progressing from the "walking together" 514 state to the "splitting" 518 state.

In one of the exemplary embodiments of the present invention, the state progression is estimated using the Hidden Markov Model 532. The model can be learned using a number of training data containing the shopper trajectories 422 along with ground truth states.

Figure 10:
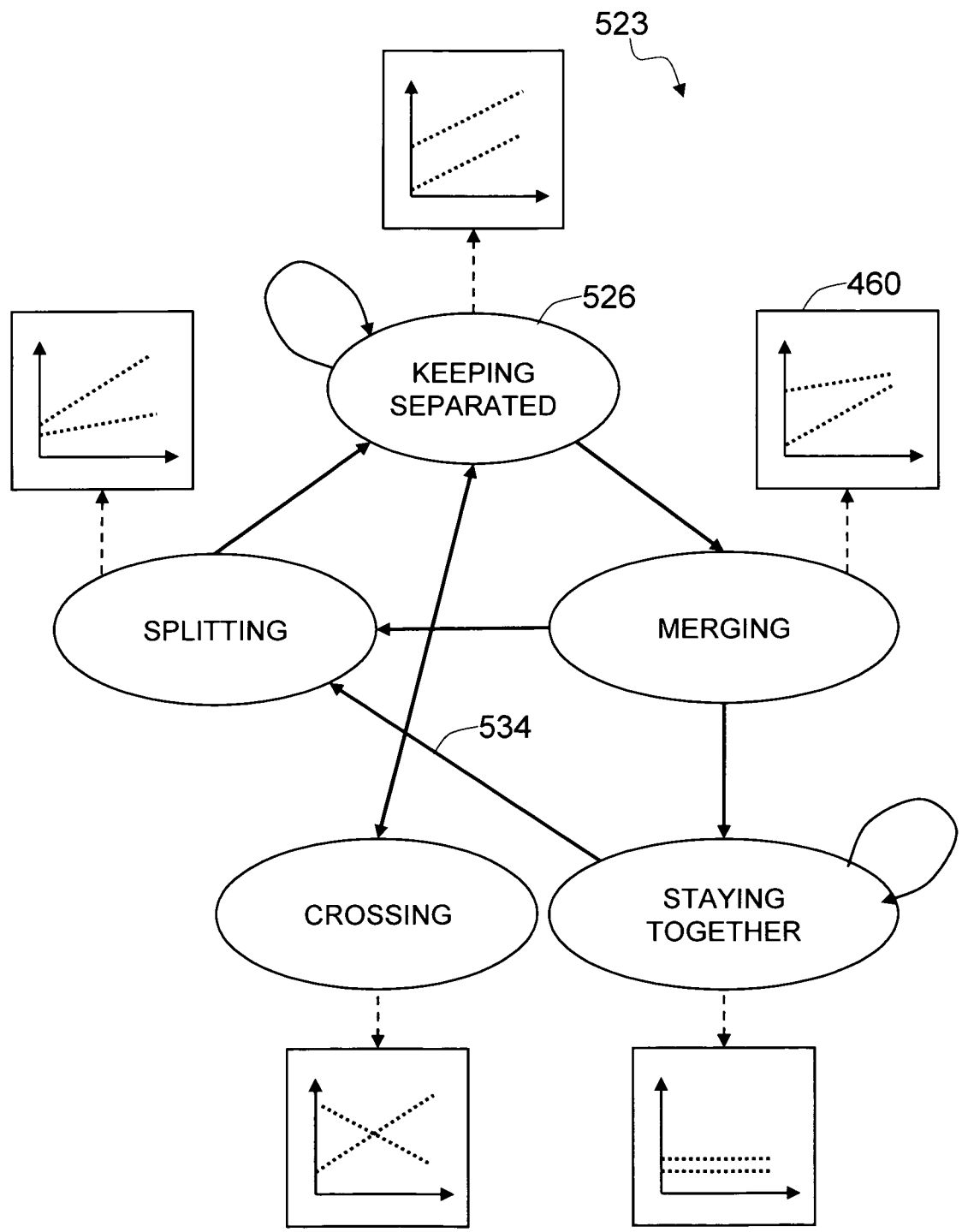
FIG. 10 shows an exemplary embodiment of the shopper group behavior model that is illustrated using a finite state machine.

FIG. 10 shows an exemplary embodiment of the shopper group behavior model 510 that is illustrated using a finite state machine. The model is named as the non-group behavior model 523; the five group behavior states 526—staying together 512, splitting 518, merging 516, crossing 520, and keeping separated 519—are the nodes of the model, and all of the possible state transitions 534 are marked by arrows.

The model can represent all of the possible scenarios (progressions of states) when two unrelated shoppers are in proximity, using the transitions of these states. The rectangles represent the typically observed group behavior features 460 when the pair of shoppers is in the corresponding state (corresponded by uni-directional arrows). The observed group behavior features 460 include the distance change 482 and the average speed 484.

The state progression of the non-group behavior can be determined based on the illustrated relationship between the states and the observed features. For example, if the pair of unrelated shoppers, who just happened to be staying together, start to separate (split), then the pair is progressing from the "staying together" state 512 to the "splitting" 518 state.

In one of the exemplary embodiments of the present invention, the state progression is estimated using the Hidden Markov Model 532. The model can be learned using a number of training data containing the shopper trajectories 422 along with ground truth states.

Figure 11:
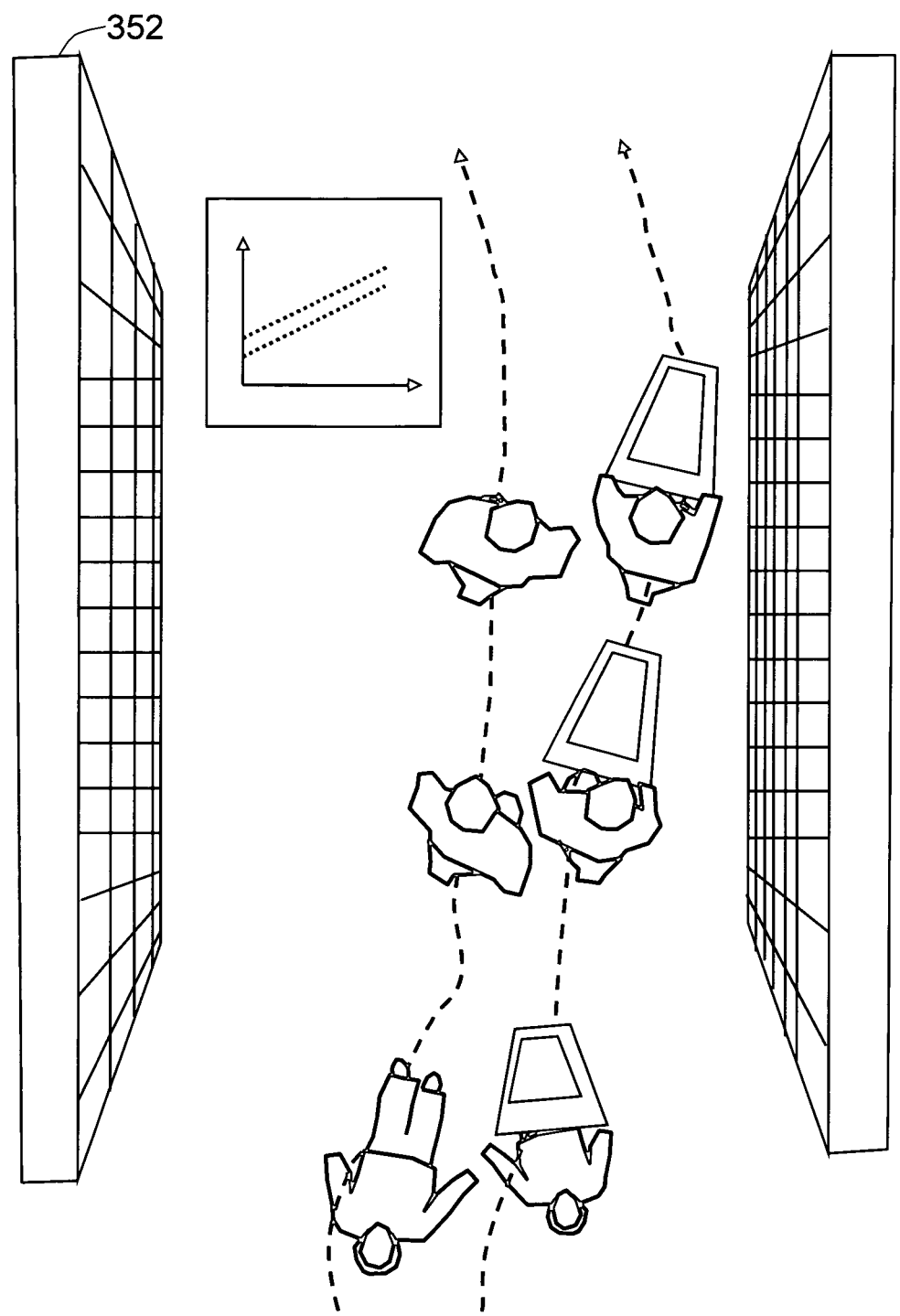
FIG. 11 shows an exemplary embodiment of the shopper trajectory model.

FIG. 11 shows an exemplary embodiment of the shopper group behavior model 510. The figure illustrates one of the shopper pair states—the walking together 514 state. The state depicts a stage in group shopping behaviors where a pair (or more than two) of shoppers move together, in a retail space, with a common interest to approach a certain position together. During the state, the pair stays close to each other, but maintains nonzero speeds that are close to each other. The plots in the rectangle show an observed group behavior feature corresponding to the state; the horizontal axis represents time and the vertical axis represents space (shown in 1D, for convenience). Each of the dotted lines is the change in distance of a shopper in the pair. The slope of the line represents the speed; the close parallel lines show that the two shoppers walk in proximity with very similar speeds.

Figure 12:
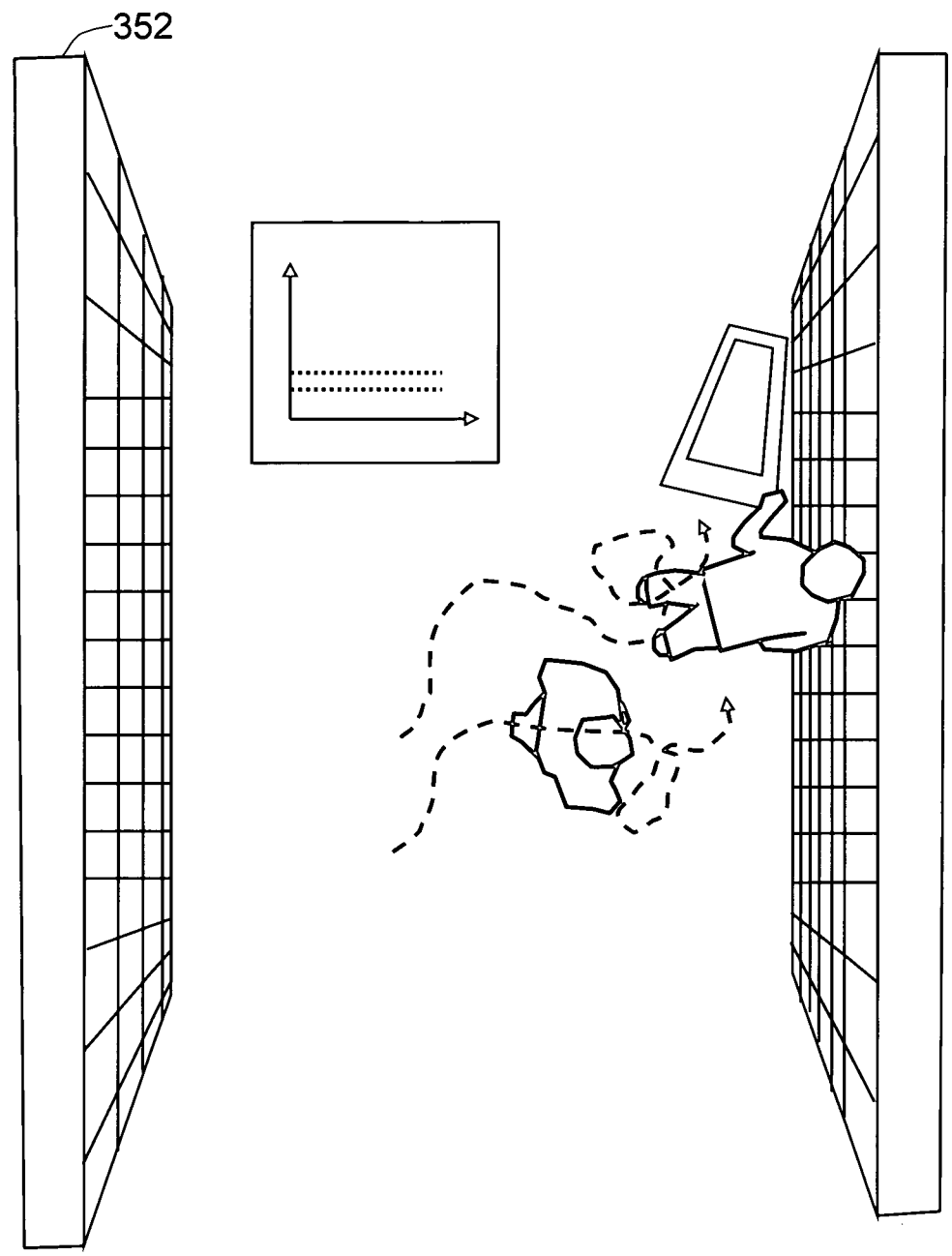
FIG. 12 shows an exemplary embodiment of the shopper trajectory model.

FIG. 12 shows an exemplary embodiment of the shopper group behavior model 510. The figure illustrates one of the shopper pair states—the staying together 512 state. The state depicts a stage in group shopping behaviors where a pair (or more than two) of shoppers stay together in proximity with a common interest to shop for an item. During the state, the pair stays in a position and close to each other. In the observed group behavior feature corresponding to the state, the two horizontal dotted lines reveal such behavior.

Figure 13:
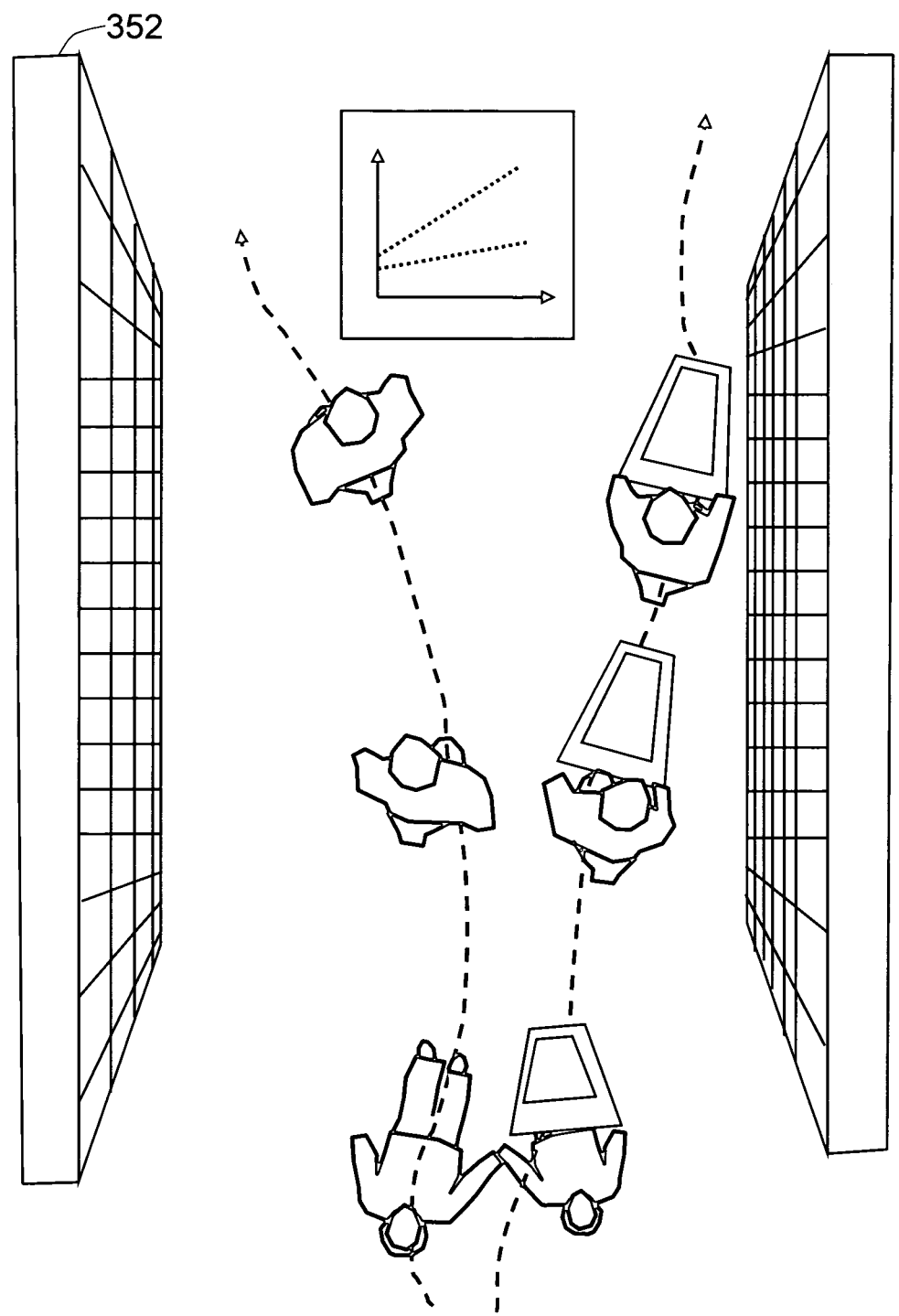
FIG. 13 shows an exemplary embodiment of the shopper trajectory model.

FIG. 13 shows an exemplary embodiment of the shopper group behavior model 510. The figure illustrates one of the shopper pair states—the splitting 518 state. The state depicts an instance in group shopping behavior where a pair of shoppers who were staying together or walking together start to separate in order to approach different sections in the store. At the start of the state, the pair stays in proximity; at the end of the state, they have increased the distance from each other. At least one shopper moves away from the other shopper in the pair. In the observed group behavior feature corresponding to the state, the two dotted lines reveal increasing distance between the shoppers.

Figure 14:
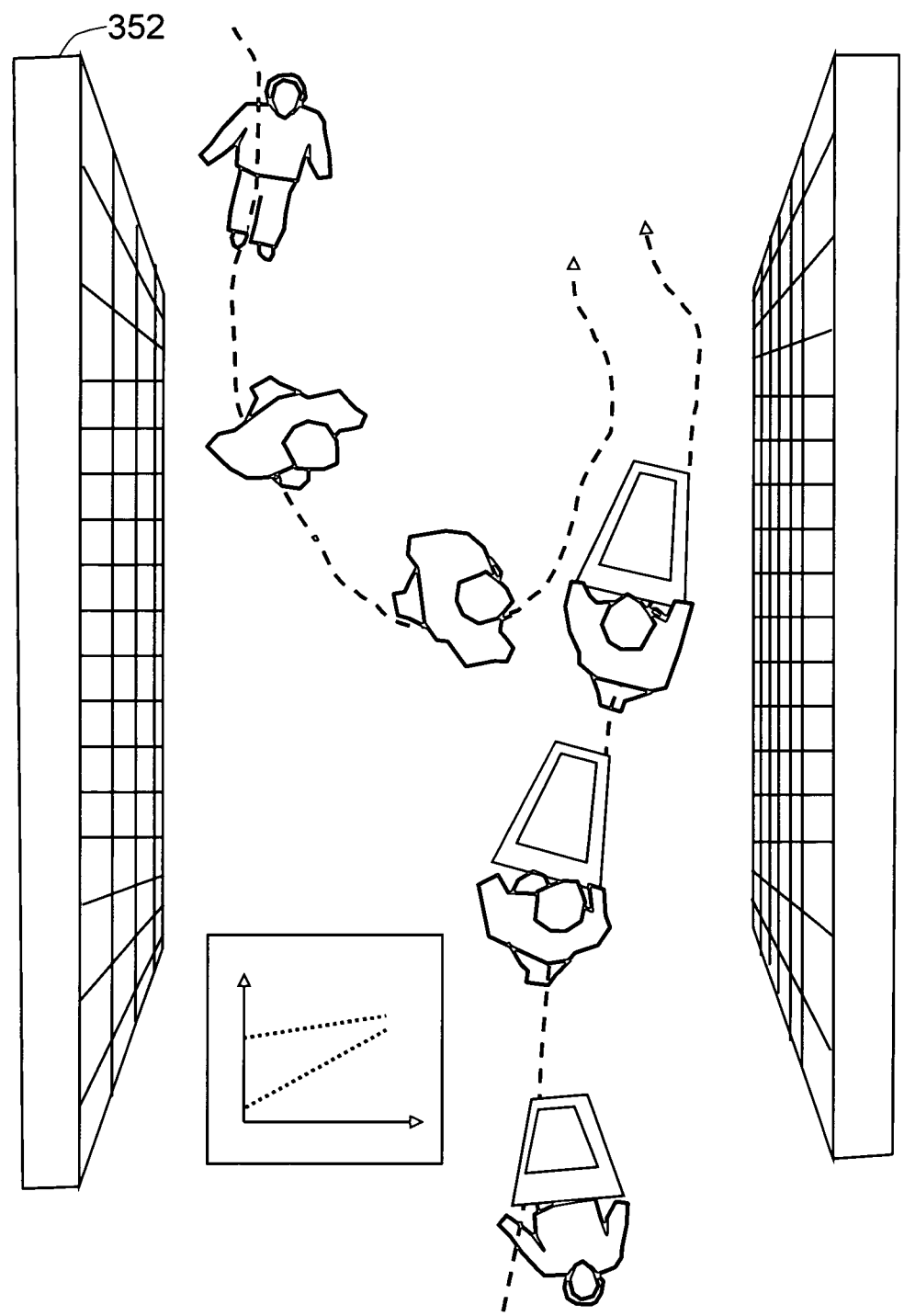
FIG. 14 shows an exemplary embodiment of the shopper trajectory model.

FIG. 14 shows an exemplary embodiment of the shopper group behavior model 510. The figure illustrates one of the shopper pair states—the merging 516 state. The state depicts an instance in group shopping behavior where a pair of shoppers, who were separated, start to join in order to stay at the same place or to approach the same place. At the start of the state, the pair stays or walks in distance; at the end of the state, they have decreased the distance from each other. At least one shopper moves toward the other shopper in the pair. In the observed group behavior feature corresponding to the state, the two dotted lines reveal decreasing distance between the shoppers.

Figure 15:
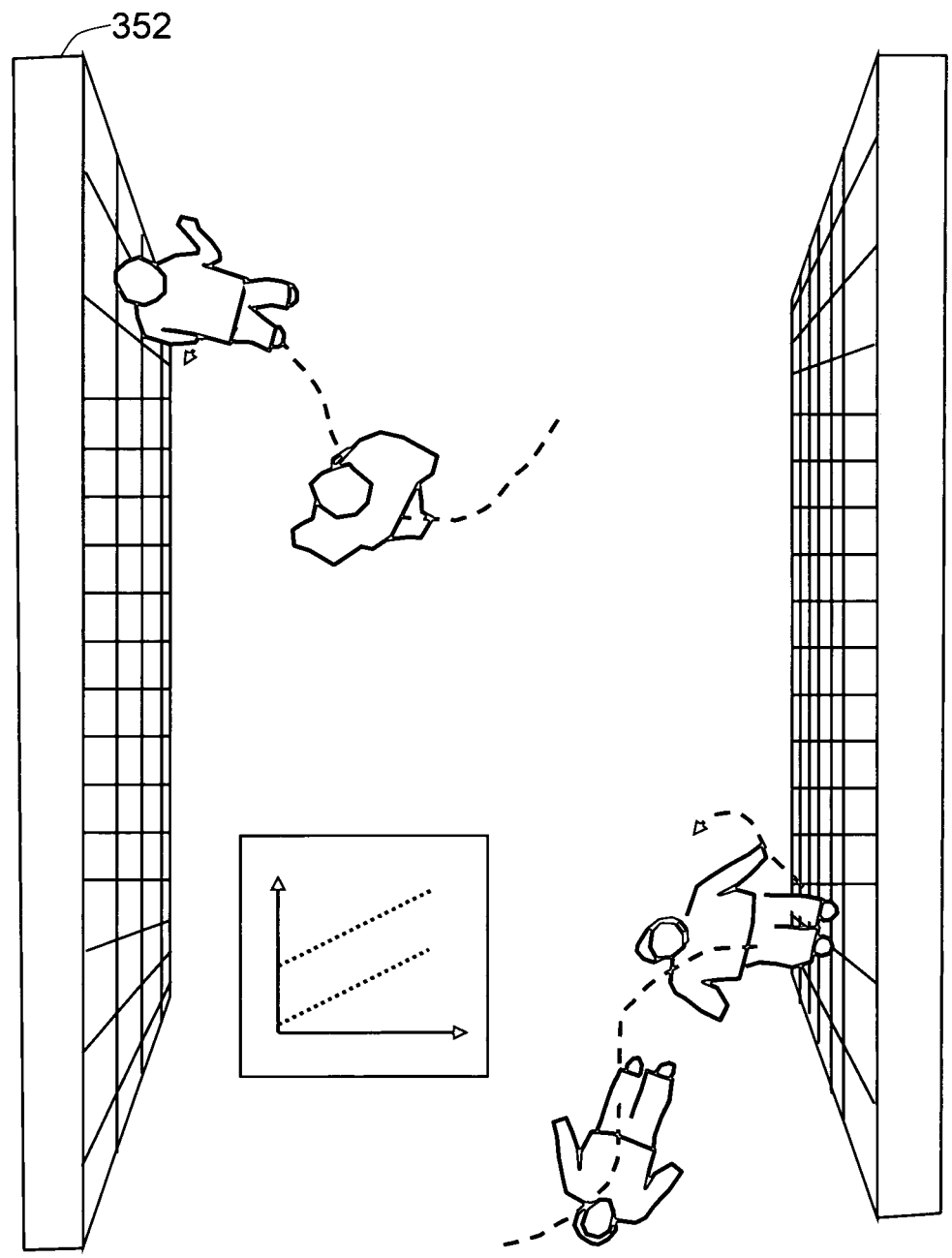
FIG. 15 shows an exemplary embodiment of the shopper trajectory model.

FIG. 15 shows an exemplary embodiment of the shopper group behavior model 510. The figure illustrates one of the shopper pair states—the keeping separated 519 state. The state depicts an instance in group shopping behavior where a pair of shoppers, who are staying in distance, keeps separated from each other. During the state, the two shoppers may move slightly close to each other; but they essentially maintain different interests or goals at the instance. In the observed group behavior feature corresponding to the state, the two far-apart dotted lines reveal that the shoppers keep distance.

Figure 16:
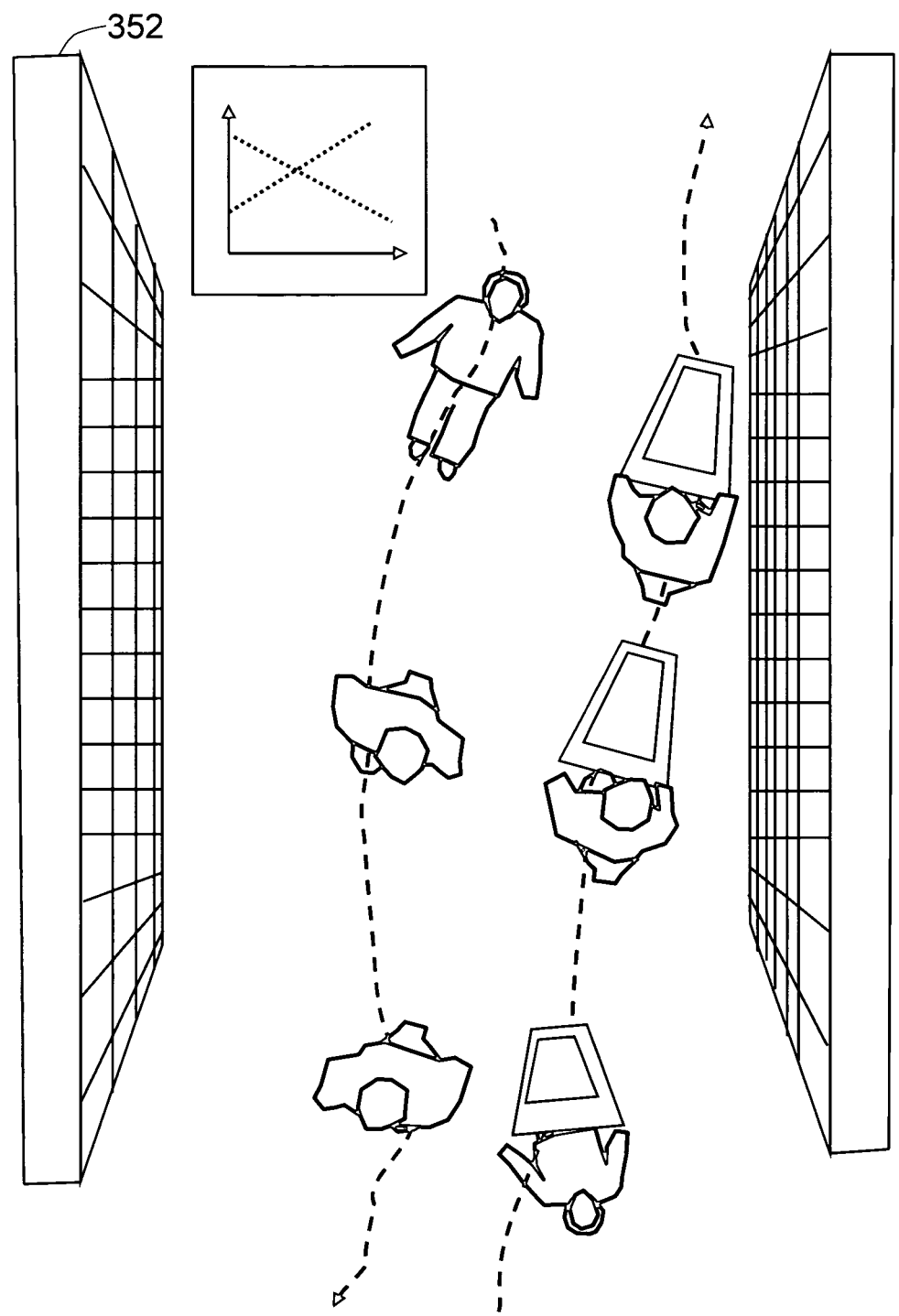
FIG. 16 shows an exemplary embodiment of the shopper trajectory model.

FIG. 16 shows an exemplary embodiment of the shopper group behavior model 510. The figure illustrates one of the shopper pair states—the crossing 520 state. The state depicts an instance in group shopping behavior where a pair of shoppers, who are not related, happen to pass by each other. During the state, the two shoppers approach from different positions and move close to each other. But they essentially don't have any intention of staying together or walking together; they get close at an instant, and then start to move away from each other. In the observed group behavior feature corresponding to the state, the two crossing dotted lines reveal that the shoppers close in, but after an instant they increase the distance from each other.

Figure 17:
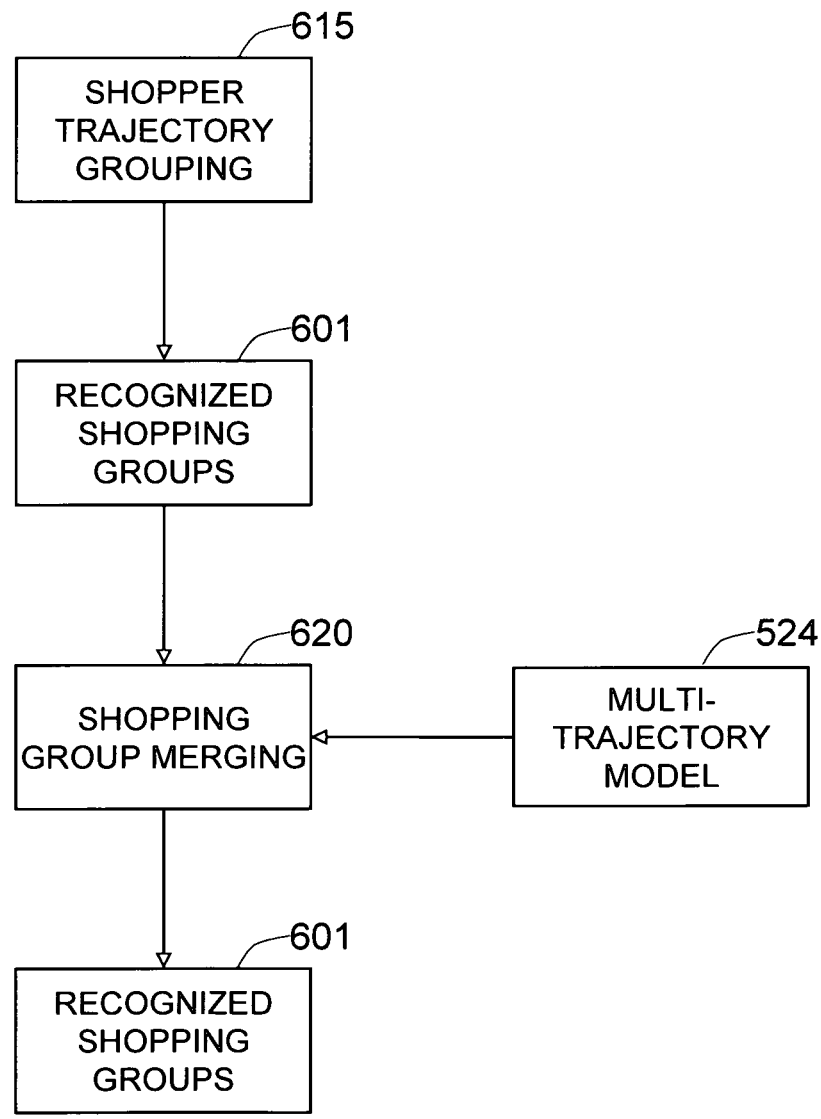
FIG. 17 shows an exemplary embodiment of the shopping group merging step.

FIG. 17 shows an exemplary embodiment of the shopping group merging 620 step. In this embodiment, the step processes the initially recognized shopping groups 601 to further combine them together to improve grouping accuracy. The step addresses the issue that some of the group behaviors are not captured within the shopper trajectory pair analysis 470 framework. The step utilizes the multi-trajectory model 524 to further examine whether any two groups (including the "group" having only one shopper) belong to the same shopping group.

Figure 18:
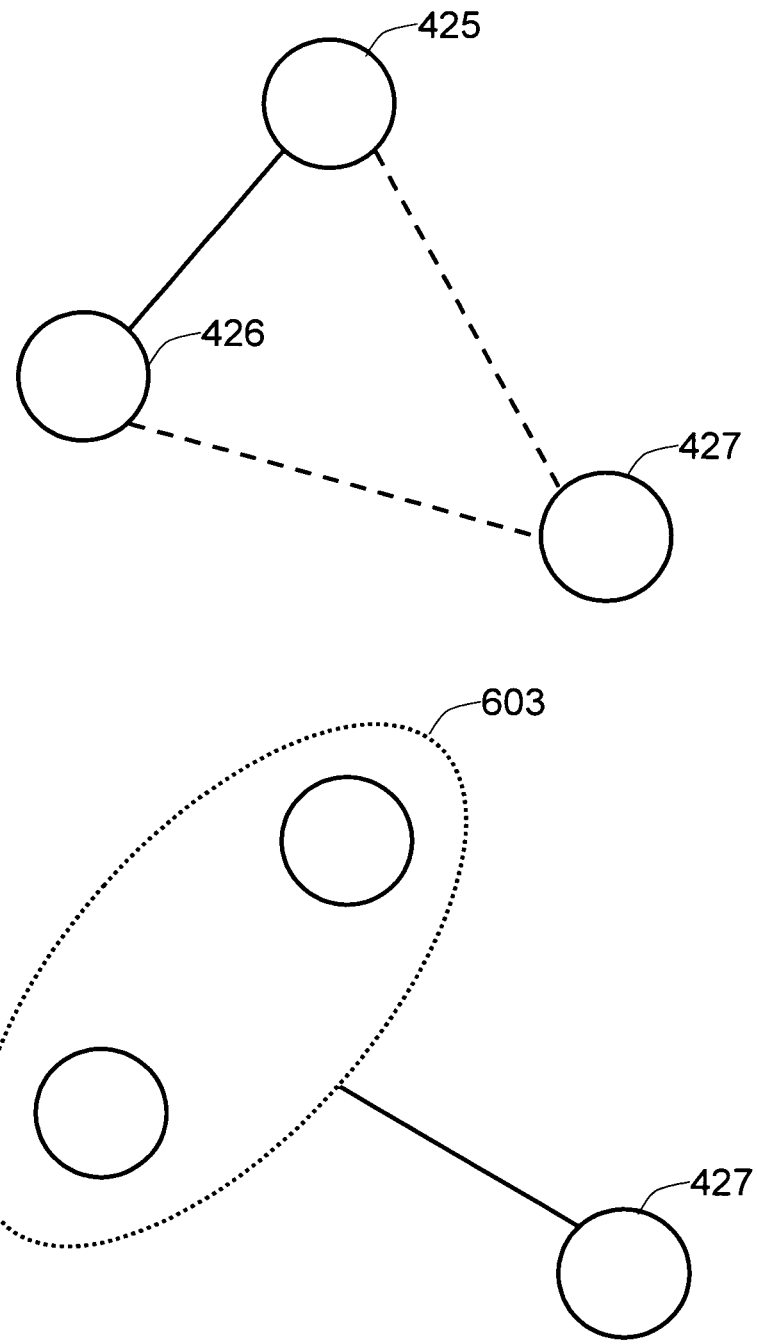
FIG. 18 shows an example of the shopping group merging step.

FIG. 18 shows an example of the shopping group merging 620 step. The circles in the figure represent the trajectories, and distances between the circles represent the match between the trajectories—the shopper trajectory pair group scores 571. In the top figure, the trajectory for shopper A 425 and the trajectory for shopper B 426 are close enough to be combined together. The trajectory for shopper C 427 is also a good candidate to be combined together with both the trajectory for shopper A 425 and the trajectory for shopper B, but is not close enough. In the shopping group merging 620 step, the shopping group 1 603 and the trajectory for shopper C 427 are examined based on the multi-trajectory for shopper model 524 to determine whether or not the interactions among the trajectory for shopper A 425, the trajectory for shopper B 426, and the trajectory for shopper C 427 provide an evidence to combine them together.

Figure 19:
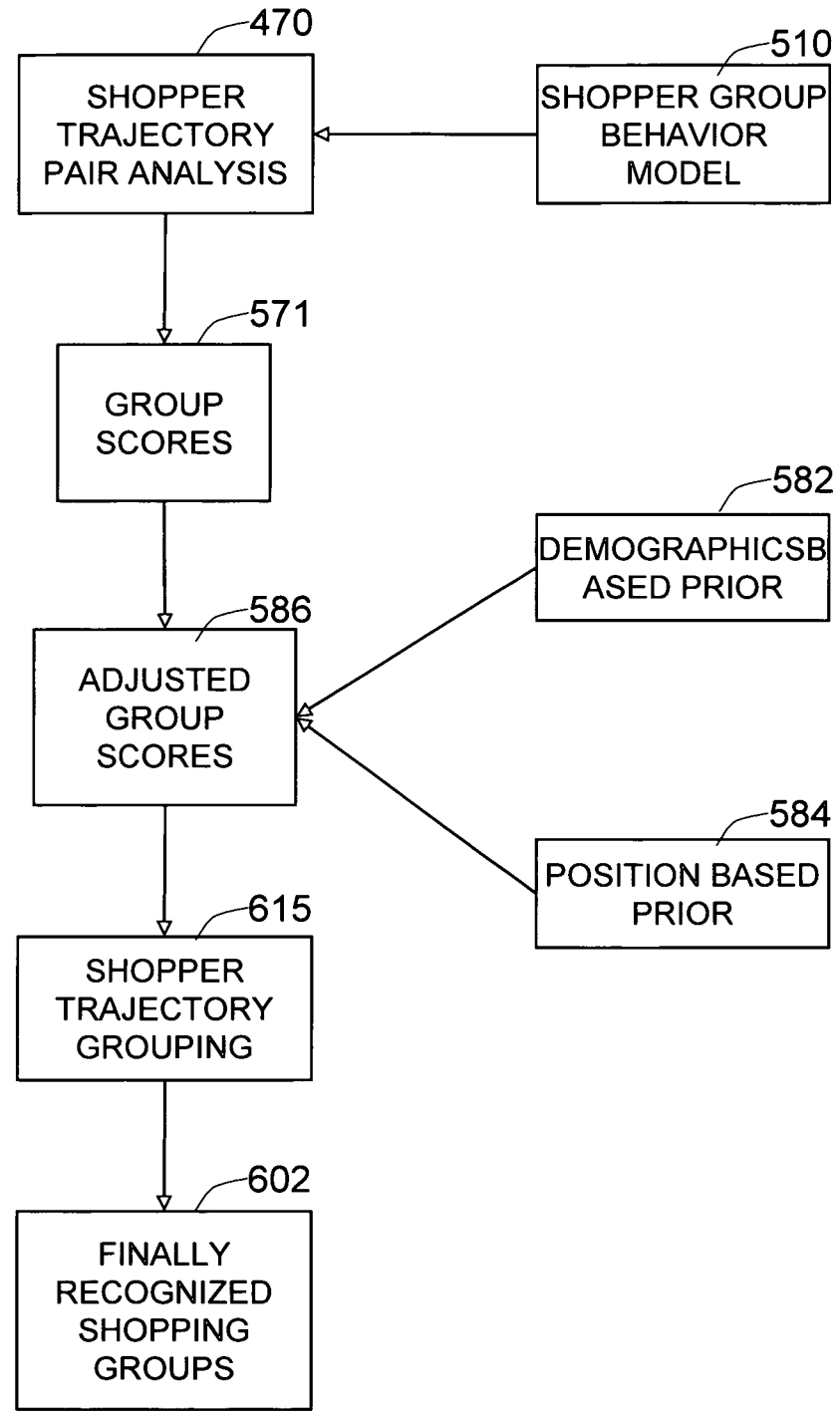
FIG. 19 shows an exemplary embodiment of the shopper trajectory grouping step.

FIG. 19 shows an exemplary embodiment of the shopper trajectory grouping 615 step. In this embodiment, the shopper trajectory grouping 615 incorporates prior information that affects the group behavior—the demographic category of each person whose trajectory is being analyzed, and the position-specific features in the retail space. If demographic categories—gender, age, or ethnicity—of the shopper pair can be determined, they can further constrain the relation between the two shoppers. For example, if there is a child in the view, the child most likely belongs to one of the adults in the scene. The position based prior 584 can discount the high shopper trajectory pair group scores when the area is busy or when the trajectories get close due to physical constraints, such as obstacles.

The shopper trajectory pair analysis 470 computes the shopper trajectory pair group scores 571 based on the shopper group behavior model 510. Both the demographics based prior 582 and the position based prior 584 are applied to adjust the scores to compute the adjusted trajectory pair group scores 586. Then the scores are used in the same way in the shopper trajectory grouping 615 step to generate the finally recognized shopping groups 602.

Figure 20:
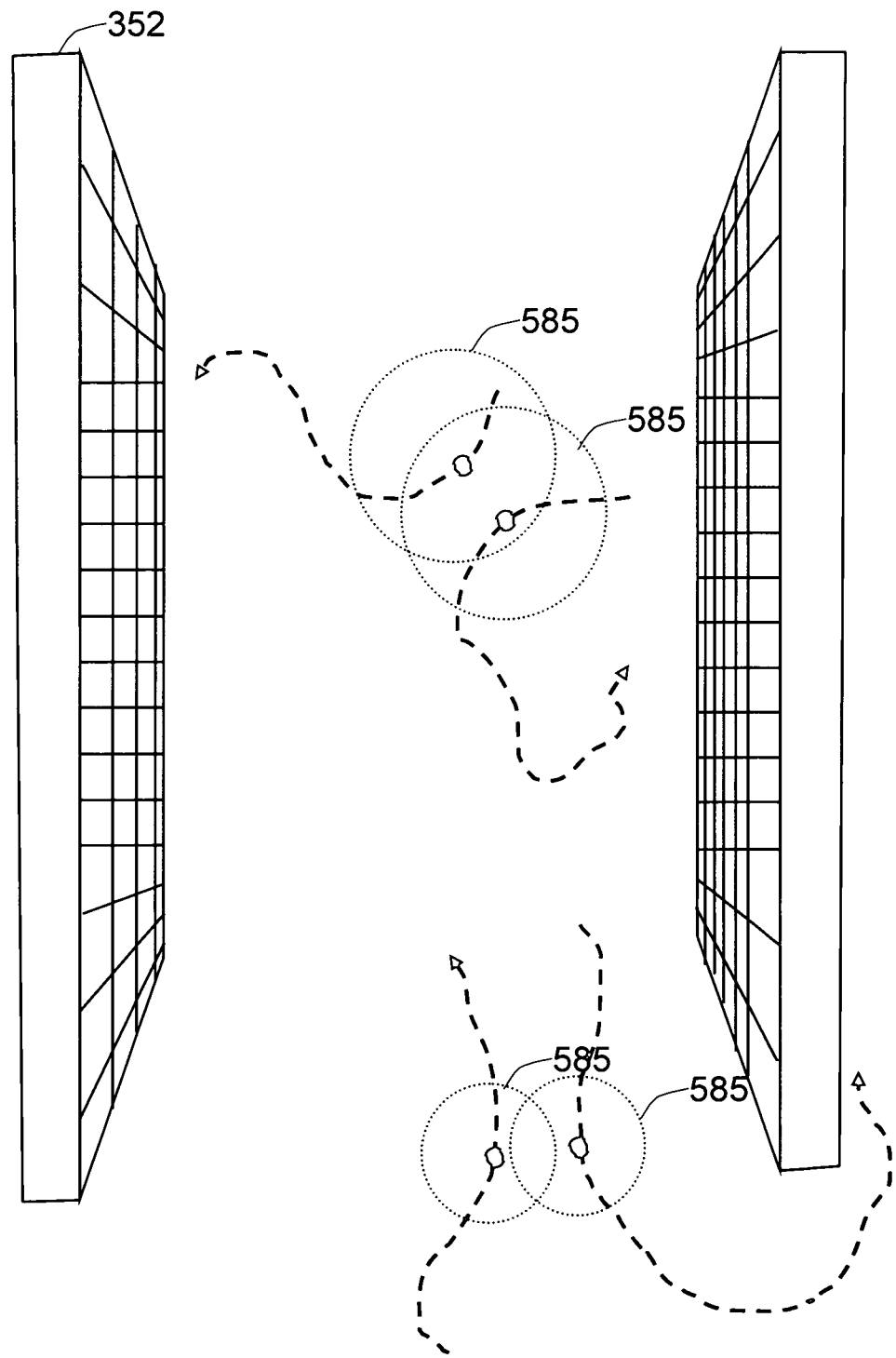
FIG. 20 shows an exemplary embodiment of the position based prior.

FIG. 20 shows an exemplary embodiment of the position based prior 584. In this embodiment, the shopper trajectory pair group scores are adjusted based on the positions of the trajectories. The pair of trajectories shown in the middle of the aisle get close enough to be grouped together. Each of the dotted circles represents an admissible range 585 for grouping—if any other trajectory enters the range, then it is grouped with the first trajectory. The position doesn't have much constraint to affect the shoppers' behavior.

On the other hand, the pair of trajectories shown at the end (bottom) of the aisle are affected by a position-based prior. Due to the tight space at the end of the aisle, any unrelated shoppers could get close. To account for such scenario, the shopper trajectory pair group scores are discounted in the area; the admissible range 585 for grouping is correspondingly reduced.

Figure 21:
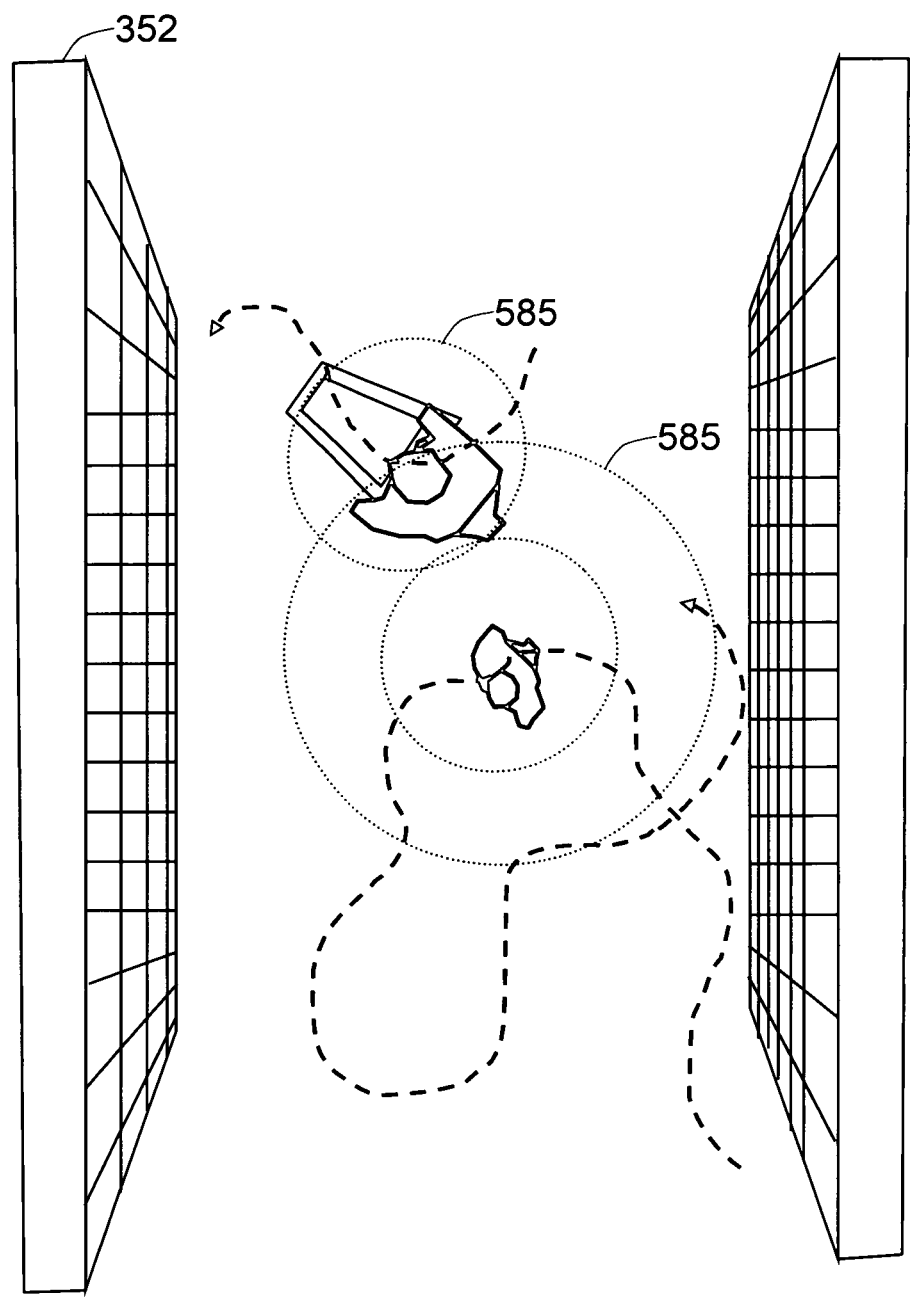
FIG. 21 shows an exemplary embodiment of the demographics based prior.

FIG. 21 shows an exemplary embodiment of the demographics based prior 582. In this embodiment, the shopper trajectory pair group scores are adjusted based on the demographic categories of the shoppers. In the figure, the person with a cart is an adult shopper. The other person is a child, who is wandering about without approaching the parent; the admissible range 585 for grouping (smaller dotted circles) do not include each other. If the system determines that one of the shoppers is a child, then the demographics based prior increases the admissible range of the corresponding trajectory. The resulting admissible range 585 is marked by the larger dotted circle, and it includes some of the trajectory points of the parent, so that the pair can be grouped together.

Figure 22:
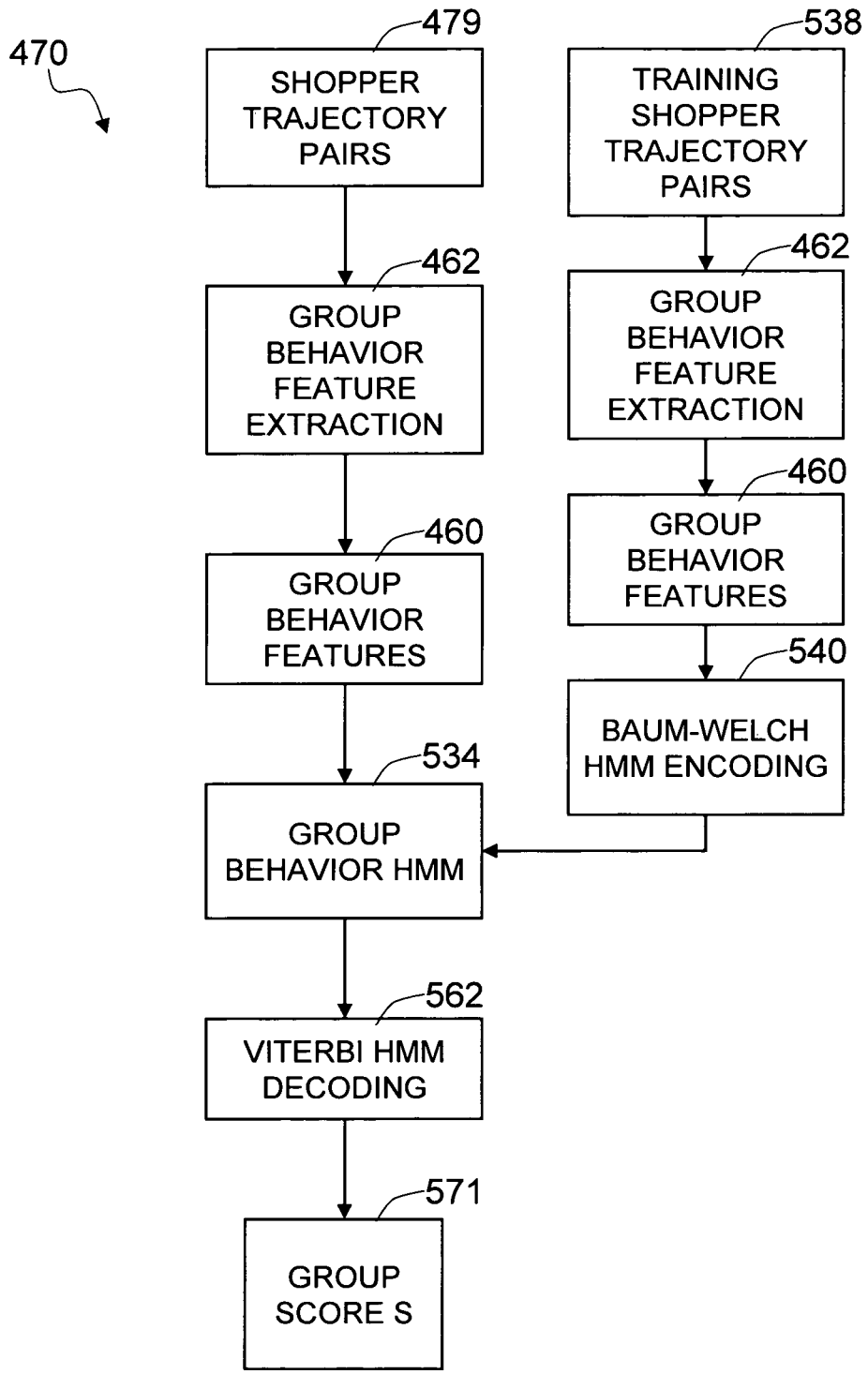
FIG. 22 shows an exemplary embodiment of the shopper trajectory pair analysis step utilizing an HMM (Hidden Markov Model) framework.

FIG. 22 shows an exemplary embodiment of the shopper trajectory pair analysis 470 step, utilizing an HMM (Hidden Markov Model) framework. First, many training shopper trajectory pairs 538 are annotated with ground truth group behavior states 526. The group behavior feature extraction 462 step then derives the group behavior features 460 of a given pair of trajectories. Then the group behavior features 460 are used to train the HMM, using the Baum-Welch HMM encoding 540 algorithm.

Then, given any pair of shopper trajectories 479, the same group behavior feature extraction 462 step derives the group behavior features 460. The group behavior features are then fed to the trained group behavior HMM 534 to decode the state progression, using the Viterbi HMM decoding 562 algorithm. Based on the decoded state progression, the group scores 571 of the pairs can be recognized.

Figure 23:
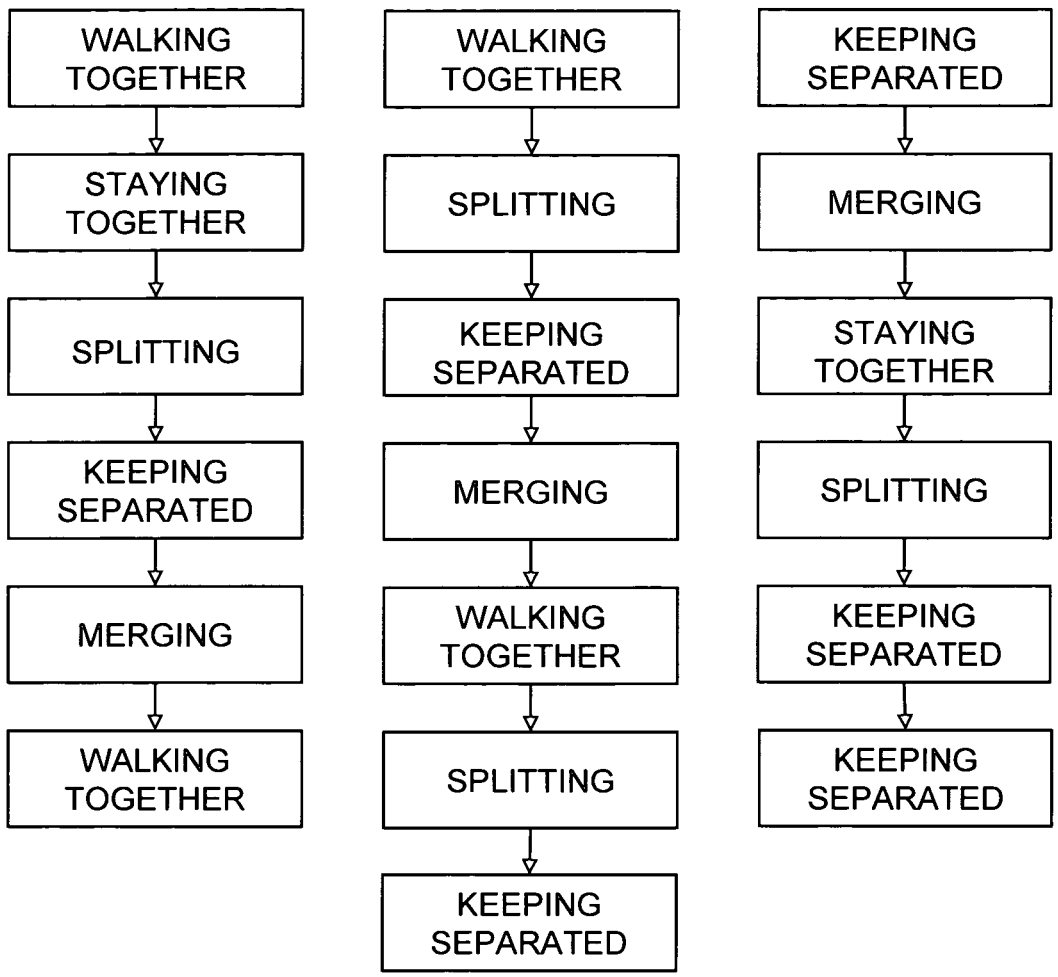
FIG. 23 shows exemplary instances of a shopping group behavior decoded from the shopper trajectory pair analysis step.

FIG. 23 shows exemplary instances of a shopping group behavior decoded from the shopper trajectory pair analysis 470 step. The left sequence starts with the walking together stage. Then the pair of trajectories indicates that the two shoppers who belong to a group stop to shop for certain products together (staying together). They then decide to go to different locations to shop for different items (splitting). After shopping separately for a while (keeping separated), they finally meet at some point (merging). Then the two shoppers again walk together to shop for common items (walking together).

In the middle shopping sequence, the two shoppers in the group show more complex behaviors of shopping individually and shopping together. The corresponding progression of group behavior states is illustrated.

In the right shopping sequence, the two shoppers do not belong to the same group. They have been naturally separated (keeping separated), then they happen to pass by each other in an aisle (crossing). Then one of the shoppers stops to shop for a certain item, while the second shopper walks away (keeping separated). The second shopper turns back, and comes back to shop for the same item (merging). They stay in proximity for a while (staying together), and then the first shopper leaves the aisle space (splitting).

FIG. 24 shows output data of the present invention in an exemplary business application. In the table, each row lists an identified group and group information. The group information has three categories: group composition, group dynamics, and group performance. The group composition consists of the number of people in the group, and the gender and the age compositions. The group dynamic information includes the identified leader in the form of the trajectory ID of the person. This information can help analyze the behavior of group leader. The group dynamic information may also include the percentage of time spent together, which is the percentage of time during which the group members have been in close proximity relative to the whole duration of the shopping. The group performance includes the total time that the group spent in the store (duration of the shopping) and the total amount of money spent by the group at the checkout. These outputs can be further investigated to provide analysis on how group composition affects both group dynamics and group performance, and also how group composition and group dynamics together affect the group performance.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for detecting shopping groups based on dynamic relation between shoppers' trajectories, comprising:
  a) building a system of video and wireless signal sensors to collect images and locations of shoppers across multiple fields of view;
  b) setting up a shopper group behavior model, wherein the shopper group behavior model consists of behavior primitive states of related shoppers, and wherein the shopper group behavior model represents all possible progressions of states when two related shoppers are in proximity;
  c) generating shoppers' trajectories from images captured by at least one video sensor or at least one wireless signal sensor, the trajectories generated using a shopper trajectory estimation module that performs the following steps:
   i) segmenting a motion foreground from a camera view,
   ii) detecting a shopper from the camera view,
   iii) tracking the shopper across multiple frames, and
   iv) estimating the trajectory based on the tracking of the shopper;
  d) extracting group behavior features from pairs of the trajectories, the group behavior features including changes in distances between the pairs of the trajectories and average speeds of the pairs of the trajectories, wherein the changes in distances between the pairs of the trajectories are determined by computing a difference trajectory between each pair of trajectories in the pairs of the trajectories,
wherein the difference trajectory is computed for a time period during which two trajectories overlap, and
wherein the difference trajectory consists of points that are vector differences between points from a first trajectory and points from a second trajectory at each matching time instance;
e) analyzing the group behavior features based on the shopper group behavior model to determine group scores, wherein each of the group scores quantizes the likelihood of the corresponding pair of shoppers belonging to a shopping group;
f) segmenting the trajectories into shopping groups based on the group scores;
g) merging multiple shopping groups into a single shopping group using a multi-trajectory shopper model to determine interactions among the trajectories of multiple shoppers;
h) utilizing demographic information of the shoppers to adjust the group scores, wherein demographic categories, including gender, age, or ethnicity, of the shoppers constrain relations among the shoppers; and
i) generating output data for further analysis, wherein the output data comprises group composition, group dynamics and group performance,
wherein group composition comprises the number, gender, and age compositions of people in a group, and
wherein the group dynamics comprise identification of a group leader by their trajectory identification and a percentage of time spent together.

2. The method according to claim 1, wherein the behavior primitive states of the shopper group behavior model comprise staying together, walking together, merging, and splitting, and
wherein state progression of a pair of the trajectories is determined using transitions among states based on the modeled relationship between the states and the group behavior features.

3. The method according to claim 1, wherein the method further comprises a step of utilizing position based prior to adjust the group scores, wherein the position based prior discounts a high group score for a pair of the trajectories and reduces the admissible range for a correct grouping when the location of the pair of the trajectories is busy or when the trajectories are close to each other due to physical constraints at the location.

4. The method according to claim 1, wherein the multi-trajectory shopper model involves three or more shoppers and examines whether any two shopping groups, including a shopping group that has only one shopper, belong to a single shopping group.

5. The method according to claim 1, wherein the group performance comprises shopping duration of a detected shopping group and total money spent by the detected shopping group.

6. A method for detecting shopping groups based on dynamic relation between shoppers' trajectories, comprising:
a) building a system of video and wireless signal sensors to collect images and locations of shoppers across multiple fields of view;
b) setting up a non-group behavior model, wherein the non-group behavior model consists of behavior primitive states of unrelated shoppers, and wherein the non-group behavior model represents all possible progressions of states when two unrelated shoppers are in proximity;
c) generating shoppers' trajectories from images captured by at least one video sensor or at least one wireless signal sensor, the trajectories generated using a shopper trajectory estimation module that performs the following steps:
  i) segmenting a motion foreground from a camera view,
  ii) detecting a shopper from the camera view,
  iii) tracking the shopper across multiple frames, and
  iv) estimating the trajectory based on the tracking of the shopper;
d) extracting group behavior features from pairs of the trajectories, the group behavior features including changes in distances between the pairs of the trajectories and average speeds of the pairs of the trajectories,
wherein the changes in distances between the pairs of the trajectories are determined by computing a difference trajectory between each pair of trajectories in the pairs of the trajectories,
wherein the difference trajectory is computed for a time period during which two trajectories overlap, and
wherein the difference trajectory consists of points that are vector differences between points from a first trajectory and points from a second trajectory at each matching time instance;
e) analyzing the group behavior features based on the non-group behavior model to determine group scores, wherein each of the group scores quantizes the likelihood of the corresponding pair of shoppers belonging to a shopping group;
f) segmenting the trajectories into shopping groups based on the group scores;
g) merging multiple shopping groups into a single shopping group using a multi-trajectory shopper model to determine interactions among the trajectories of multiple shoppers;
h) utilizing demographic information of the shoppers to adjust the group scores, wherein demographic categories, including gender, age, or ethnicity, of the shoppers constrain relations among the shoppers; and
i) generating output data for further analysis, wherein the output data comprises group composition, group dynamics, and group performance,
wherein group composition comprises the number, gender, and age compositions of people in a detected shopping group, and
wherein the group dynamics comprise identification of a group leader by their trajectory identification and a percentage of time spent together.

7. The method according to claim 6, wherein the behavior primitive states of the non-group behavior model comprise staying together, crossing, merging, and splitting, and
wherein state progression of a pair of the trajectories is determined using transitions among states based on the modeled relationship between the states and the group behavior features.

8. The method according to claim 6, wherein the method further comprises a step of utilizing position based prior to adjust the group scores, wherein the position based prior discounts a high group score for a pair of the trajectories and reduces the admissible range for a correct grouping when the location of the pair of the trajectories is busy or when the trajectories are close to each other due to physical constraints at the location.

9. The method according to claim 6, wherein the multi-trajectory shopper model involves three or more shoppers and examines whether any two shopping groups, including a shopping group that has only one shopper, belong to a single shopping group.

10. The method according to claim 6, wherein the group performance comprises shopping duration of a detected shopping group and total money spent by the detected shopping group.

\* \* \* \* \*